United States Patent
Liu et al.

(10) Patent No.: US 9,011,034 B2
(45) Date of Patent: Apr. 21, 2015

(54) SEAM CLAMP FOR SOLAR PANEL AND ROOFTOP OBJECTS

(71) Applicant: Sunmodo Corporation, Vancouver, WA (US)

(72) Inventors: Jun Liu, Camas, WA (US); Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 34 days.

(21) Appl. No.: 13/792,129

(22) Filed: Mar. 10, 2013

(65) Prior Publication Data

US 2014/0341645 A1 Nov. 20, 2014

(51) Int. Cl.
| | |
|---|---|
| *B23Q 1/48* | (2006.01) |
| *F16B 2/06* | (2006.01) |
| *F16B 2/12* | (2006.01) |
| *F24J 2/52* | (2006.01) |

(52) U.S. Cl.
CPC .......... *F16B 2/065* (2013.01); *Y10T 403/5773* (2015.01); *F16B 2/12* (2013.01); *F24J 2/52* (2013.01)

(58) Field of Classification Search
USPC .............. 403/256, 258, 262, 264, 373–374.3, 403/381; 52/173.3, 543; 136/244; 126/623
See application file for complete search history.

(56) References Cited

U.S. PATENT DOCUMENTS

| | | | |
|---|---|---|---|
| 3,039,161 A | 8/1960 | Gangon | |
| 3,397,879 A | 8/1968 | Morawaski et al. | |
| 5,222,340 A * | 6/1993 | Bellem | 52/463 |
| 5,694,720 A | 12/1997 | Walcher et al. | |
| 6,536,166 B1 * | 3/2003 | Alley | 52/25 |

(Continued)

FOREIGN PATENT DOCUMENTS

JP 2001288863 A 10/2001

OTHER PUBLICATIONS

"Ace Clamp Jr. Technical Datasheet", Jun. 2010, Unirac, Albuquerque NM.

(Continued)

*Primary Examiner* — Victor Macarthur
(74) *Attorney, Agent, or Firm* — Mark E. Beatty; John P. Wooldridge

(57) ABSTRACT

Disclosed is a seam clamp for securing equipment, such as solar PV panels, to standing roofs. The seam clamp includes an outer clamp member, an outer support member, and an inner clamp member. The inner clamp member and outer clamp member both include a clamping jaw projecting inward toward each other. The inner clamping member movably attached to the outer support member allowing the clamping jaws to engage and secure a standing seam. For ease of assembly, the outer clamp member and outer support member are slideably engaged and can be optionally captively slideably engaged. The seam clamp can be configured to accommodate different standing seam shapes by substituting alternative outer clamp members.

18 Claims, 24 Drawing Sheets

(56) References Cited

U.S. PATENT DOCUMENTS

| | | | |
|---|---|---|---|
| 7,013,612 B2 * | 3/2006 | Haddock | 52/545 |
| 7,100,338 B2 * | 9/2006 | Haddock | 52/545 |
| 7,513,080 B1 * | 4/2009 | Showalter | 52/24 |
| 7,703,256 B2 * | 4/2010 | Haddock | 52/543 |
| D629,679 S * | 12/2010 | Riddell et al. | D8/394 |
| 8,070,119 B2 | 12/2011 | Taylor | |
| 8,122,648 B1 * | 2/2012 | Liu | 52/58 |
| 8,272,172 B2 | 9/2012 | Li | |
| 2002/0088196 A1 * | 7/2002 | Haddock | 52/543 |
| 2004/0200186 A1 * | 10/2004 | Haddock | 52/782.1 |
| 2009/0019796 A1 * | 1/2009 | Liebendorfer | 52/173.3 |
| 2010/0058701 A1 | 3/2010 | Yao et al. | |
| 2012/0138764 A1 * | 6/2012 | Kemple | 248/316.1 |
| 2012/0299233 A1 | 11/2012 | Header | |

OTHER PUBLICATIONS

Ace Clamp Attachment Solutions for Standing Seam Metal Roofs, Jan. 2011, SFS intec, Inc. Wyomissing, PA.

Sunfix Plus, Aug. 2012, SolarWorld, Camarillo, CA.

S-5! The Right Way: S-5 PV Kit, Jan. 2012, Metal Roof Innovations Ltd., Colorado Springs, CO.

* cited by examiner

SEAM CLAMP FOR SOLAR PANEL AND ROOFTOP OBJECTS

BACKGROUND

The present disclosure relates to an apparatus for mounting solar panels or other equipment, such as air conditioning units or fans, walkways, signage, facades, or ladders to a seamed metal or fiberglass roof.

Seamed roofs are found in commercial and residential applications. Mounting equipment, such as solar photovoltaic (PV) panels, to standing seam roofs can provide particular challenges. For example, there are variations in the seam peak shape and the seam pitch. Examples of standing seam roof types include L-shaped, I-shaped, bulb shaped, and T-shaped seams of various heights and thicknesses. Because the wide variation of available seam shapes, heights, and thicknesses, some manufacturers offer clamp types for each seam shape. In addition, some seam clamps require two or more fasteners to secure them to the seam in addition to equipment mounting fasteners. Others have complex clamping systems that can potentially make the equipment installation more costly.

SUMMARY

This Summary introduces a selection of concepts in simplified form that are described the Description. The Summary is not intended to identify essential features or limit the scope of the claimed subject matter.

Disclosed is a standing seam clamp and standing seam roof equipment mounting apparatus that attempts to overcome the aforementioned challenges. One of the advantages of the disclosed standing seam clamp is that it may be adapted to work with a variety of standing seam roof seam types by simply changing one removable outer clamping section. The standing seam clamp can also be adapted to support rail-mounted equipment; for example one or more rail mounted solar PV panels. For example, the top surface of the seam clamp can be adapted to accept the bottom portion of an L-bracket. The top portion of the L-bracket can be used to engage a mounting rail.

The standing seam clamp can also be adapted to directly mount the solar PV panels by engaging the solar PV panel against the top surface of the seam clamp. An alignment projection, projecting upward from the top of the seam clamp, can align the panel in a desired orientation with respect to the standing seams. A solar panel end clamp or mid-clamp in combination with a threaded fastener, can be used to secure the solar PV panels to the clamp surface.

The standing seam clamp includes an outer clamp member, an inner clamp member, and an outer support member. The outer clamp member, the inner clamp member, and the outer support member, each include a top and a side portion; the top portion projecting inwardly away from the side portion. The outer clamp member and inner clamp member each include a clamping portion projecting inwardly away from the side portion and positioned below the top portion. The outer clamp portion includes a shelf portion projecting inwardly away from the side portion and a positioned between the top portion and the clamping portioning of the outer clamp member. The top portions of the outer clamp member and the outer support member are engaged in slideable cooperation for assembly. The top portions can optionally be engaged in slideable captive cooperation for assembly. Both the slideable cooperation and slideable captive cooperation can be accomplished by a tongue and groove arrangement between the top portions of the outer clamp member and the outer support member.

The side portion of the inner clamp member configured to be movable relative to the side portion outer support member. The top portion of the inner clamp member is positioned above the shelf portion of the outer clamp member. This arrangement provides vertical support for the top portion of the inner clamp member.

DRAWINGS

DESCRIPTION

Figure 1A:
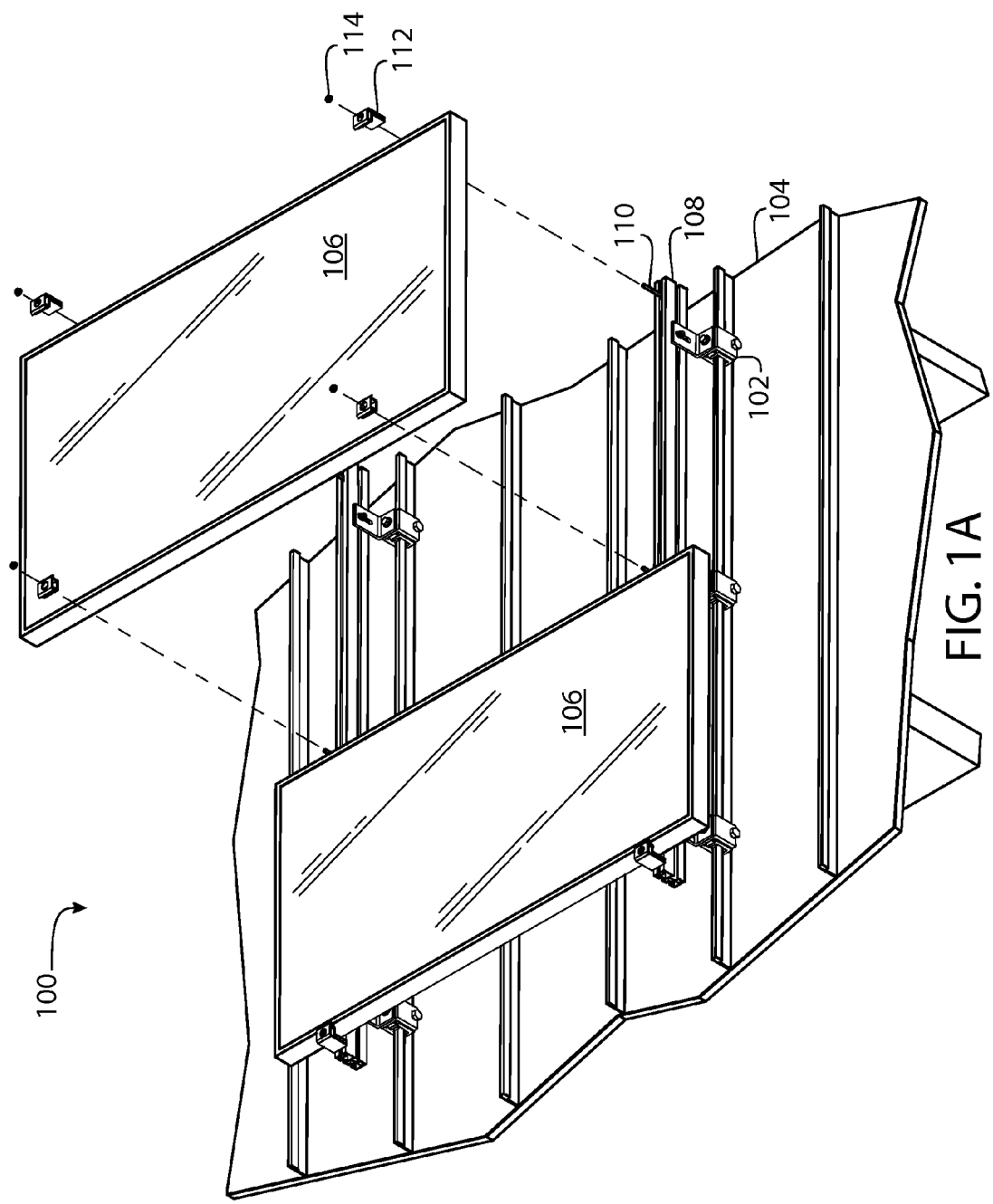
FIG. 1A shows a solar panel roof system exploded view with a standing seam clamp.

Throughout this disclosure, use of the terms "right", "left", "front", "back", "horizontal" or "vertical" are used for clarity in understanding the drawings, refer to the orientation of objects as they appear in the drawings, and denote relative orientation of the elements in combination. They are not meant to limit the disclosed standing steam clamps or standing seam clamp assemblies to a particular absolute orientation.

Figure 1B:
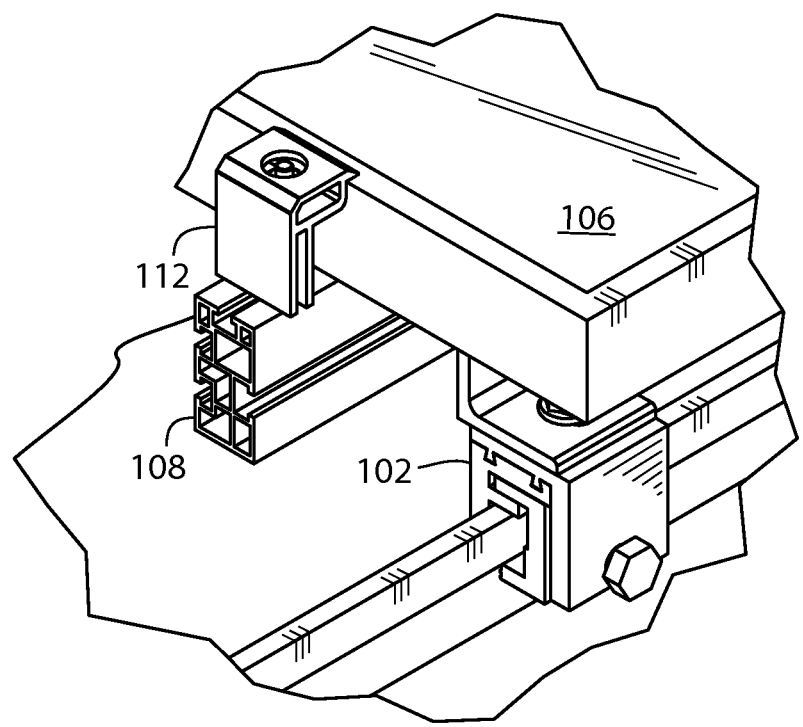
FIGS. 1B-1C show detail views illustrating the standing seam clamp of the solar PV panel roof system of FIG. 1A.
Figure 1C:
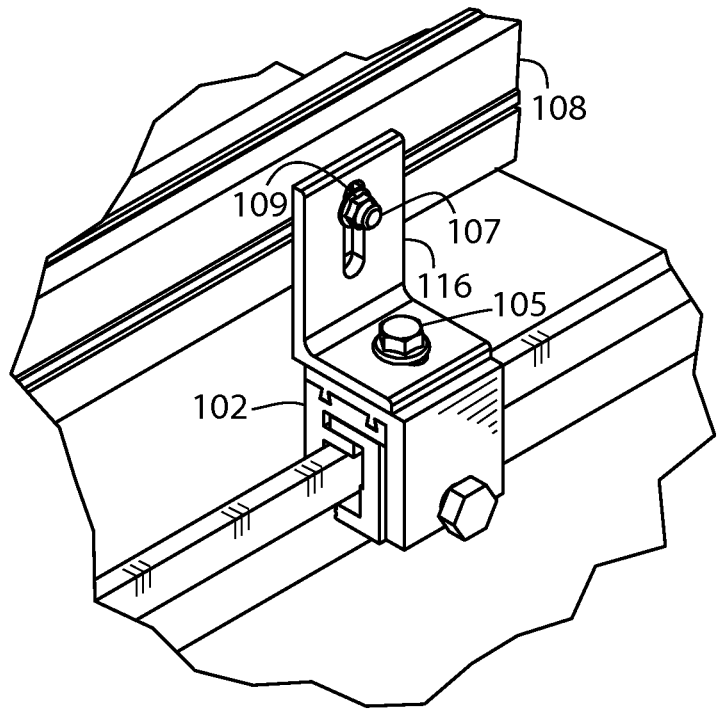

The following description is made with reference to figures, where like numerals refer to like elements throughout the several views, FIG. 1A shows solar PV panel roof system 100 in partially exploded view. FIGS. 1B-1C show detail views illustrating a standing seam clamp 102 and equipment mounting portions of the solar panel roof system of FIG. 1A. Referring to FIG. 1A, the standing seam clamp 102 is mounted to a standing seam roof 104. Referring to FIG. 1C, the top of the standing seam clamp 102 is secured to an L-bracket 116. The L-bracket 116 is mounted to the top of the standing seam clamp 102 by a threaded fastener 105. The threaded fastener 105 can be any threaded fastener suitable for securing the L-bracket 116 to the standing seam clamp 102 and withstand the forces associated with roof mounted equipment. For example, the threaded fastener can be a bolt, cap screw, or machine screw. The L-bracket 116 is shown secured to a mounting rail 108 by a threaded fastener 107 and a nut 109.

Referring again to FIG. 1A, a solar PV panel 106 is secured to the mounting rail 108 by a combination by a threaded fastener 110, a solar panel end clamp 112 and a nut 114. The threaded fastener 110 can be any threaded fastener capable of securing the solar panel to a rail slot. FIG. 1B shows a detail view of the solar PV panel 106, the mounting rail 108, the solar panel end clamp 112, and the standing seam clamp 102.

Figure 2A:
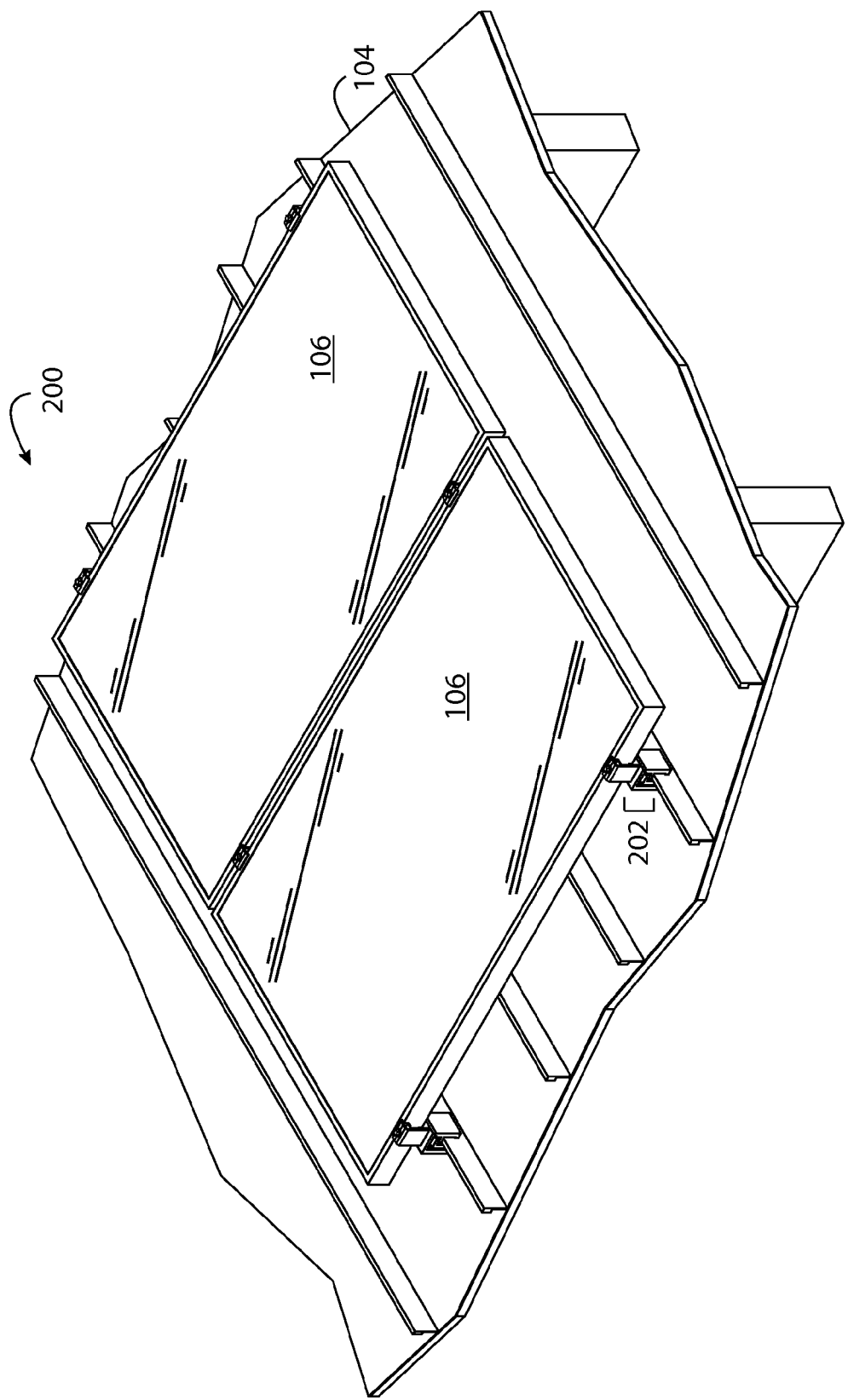
FIG. 2A shows solar PV panel roof system where the solar PV panel is mounted directly to a standing seam clamp without rails.
Figure 2B:
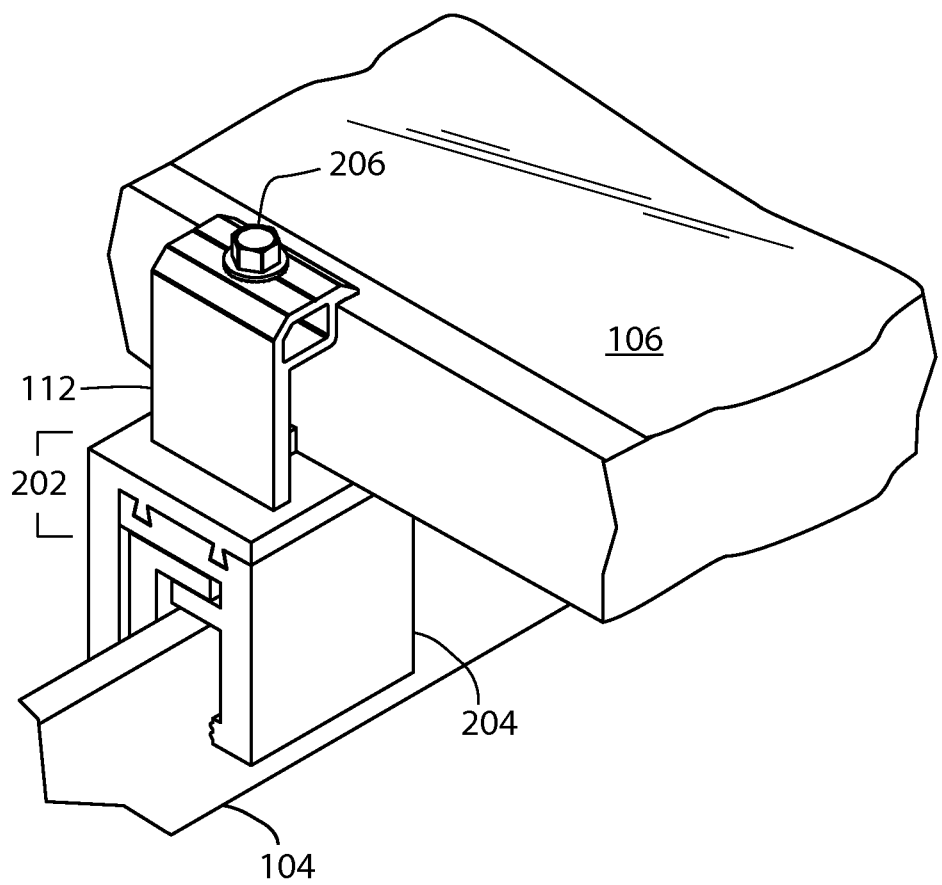
FIG. 2B shows a detail view of the standing seam roof equipment mounting apparatus and standing seam clamp of FIG. 2A.

FIG. 2A shows solar PV panel roof system 200 where the solar PV panel 106 is mounted directly to a standing seam roof equipment mounting apparatus 202 without the rails of FIGS. 1A-1C. FIG. 2B shows a detail view of the standing seam roof equipment mounting apparatus 202 of FIG. 2A. Referring to FIG. 2A, the solar PV panel roof system 200 includes the solar PV panel 106 and the standing seam roof equipment mounting apparatus 202. The standing seam roof equipment mounting apparatus 202 is secured to the standing seam roof 104. Referring to FIG. 2B, the standing seam roof equipment mounting apparatus 202 includes a seam clamp 204, the solar panel end clamp 112, and a threaded fastener 206. The threaded fastener 206 is shown as a bolt. The seam clamp 204 is secured to the standing seam portion of the standing seam roof 104. The solar panel end clamp 112 and the threaded fastener 206 secure the solar PV panel 106 to the standing seam clamp 204. The threaded fastener 206 can be any threaded fastener capable withstanding the normal forces associated with a solar PV panel 106 mounted on a rooftop. For example, a bolt, a cap screw, or a machine screw.

Figure 3A:
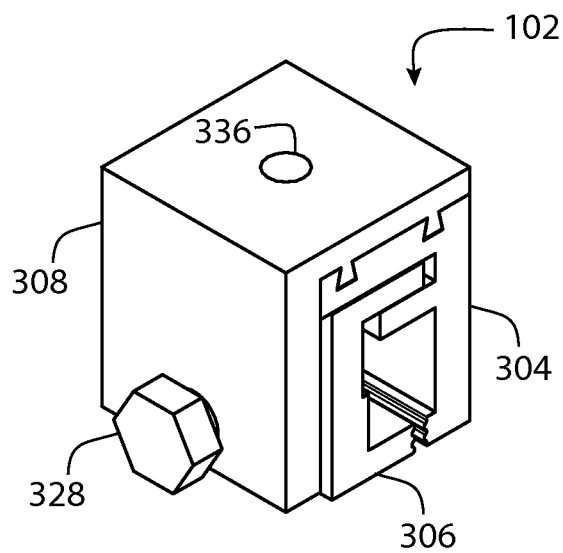
FIGS. 3A-3H show several views of the seam clamp of FIG. 1A.
Figure 3B:
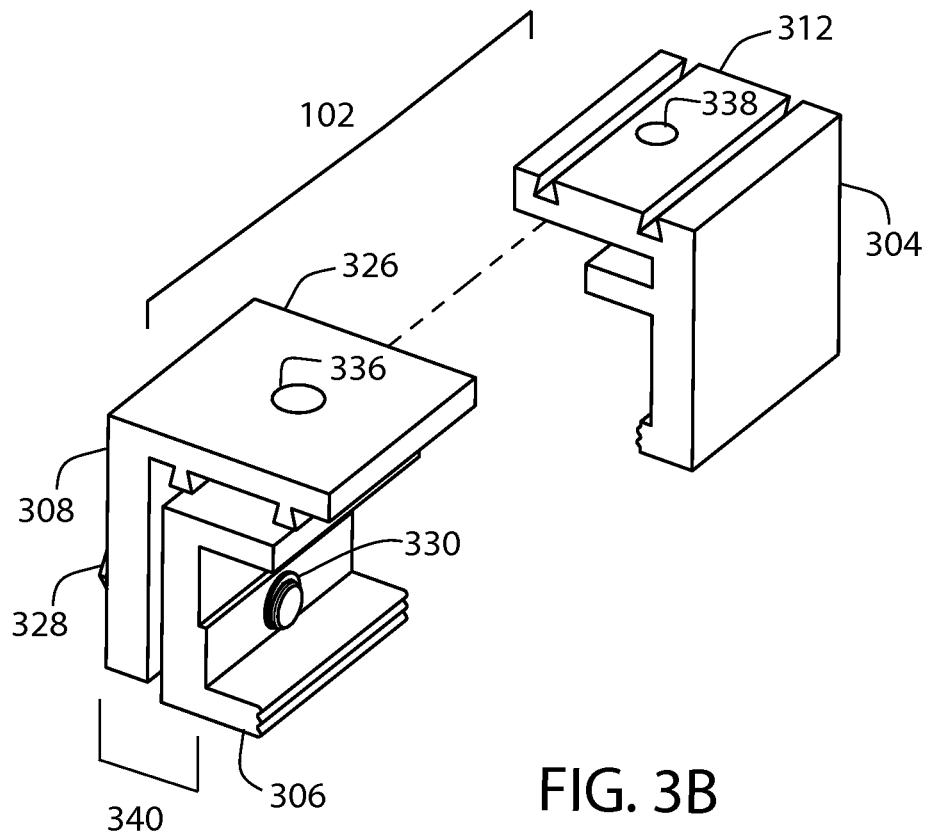
Figure 3C:
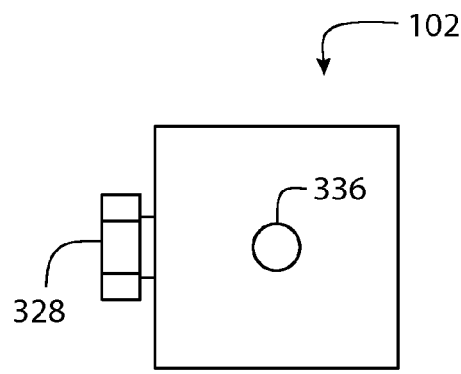
Figure 3D:
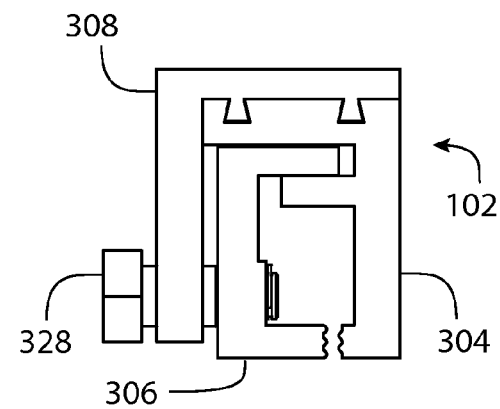
Figure 3E:
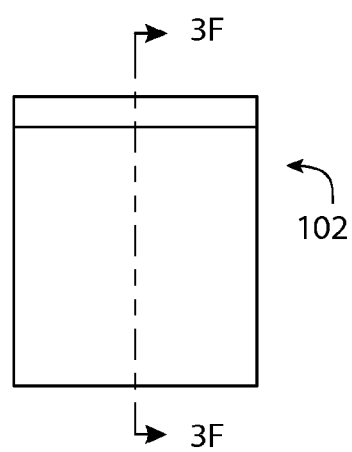
Figure 3F:
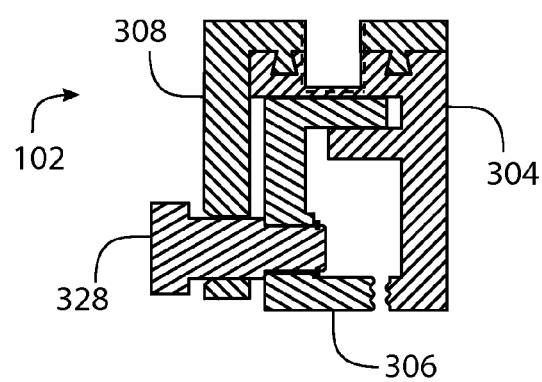
Figure 3G:
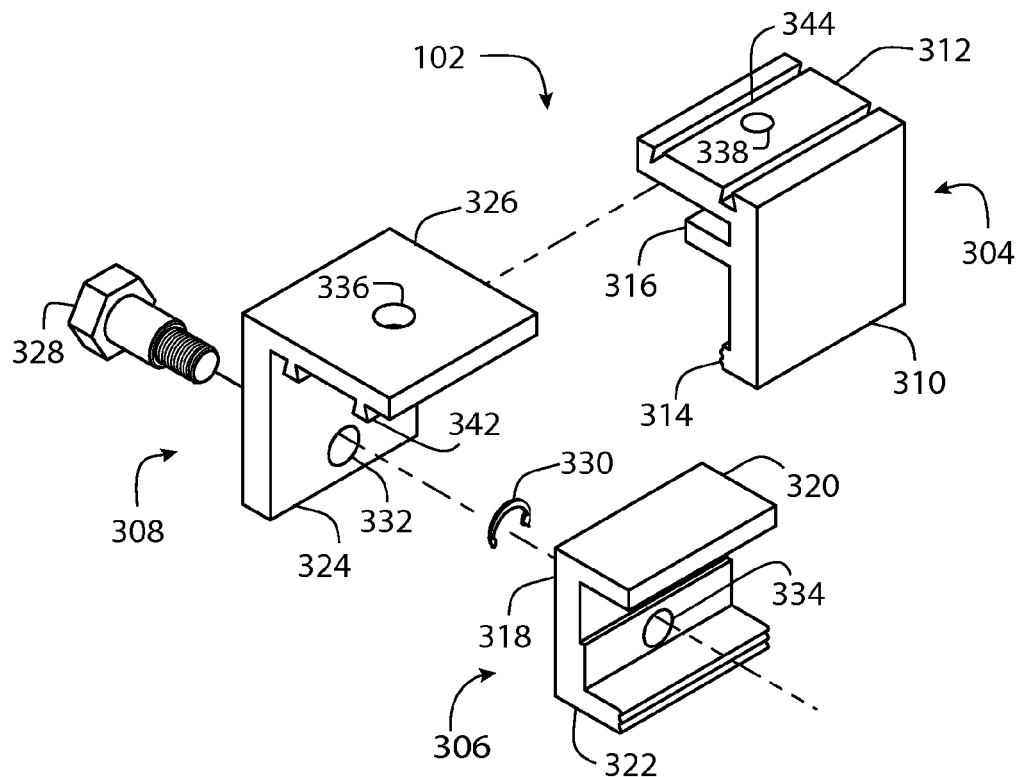
Figure 3H:
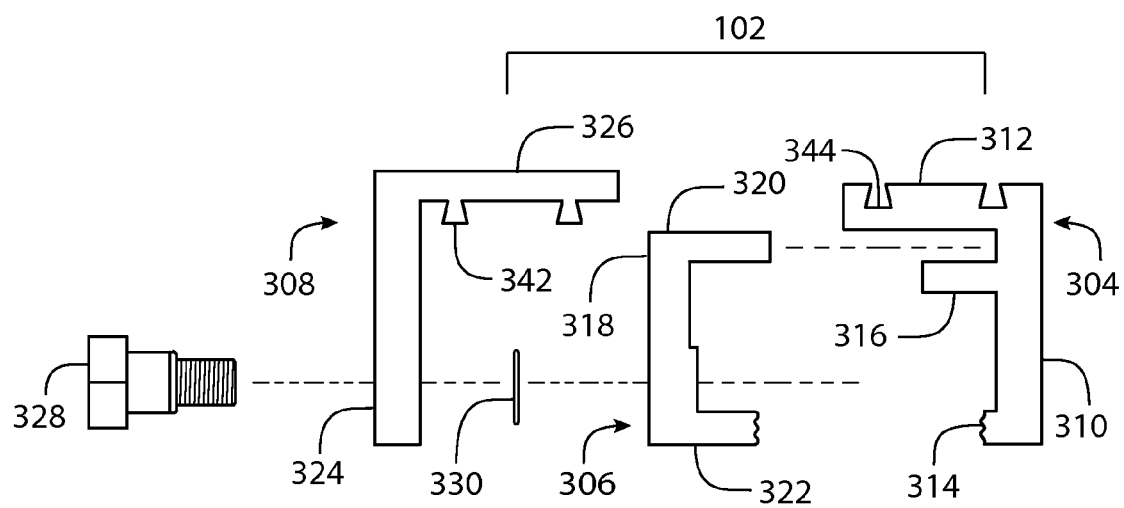

FIGS. 3A-3H show various views of the standing seam clamp 102 of FIG. 1A. FIG. 3A shows a front perspective view of the standing seam clamp 102. FIG. 3B shows a partially assembled front perspective view of the standing seam clamp 102. FIG. 3C shows a top view of the standing seam clamp 102. FIG. 3D shows a front view of the standing seam clamp 102. FIG. 3E shows a right side view of the standing seam clamp 102. FIG. 3F shows a front cross sectional view of the standing seam clamp 102 of FIG. 3E. FIG. 3G is an exploded view front perspective view of the standing seam clamp 102. FIG. 3H is a front exploded view of the standing seam clamp 102.

Referring to FIGS. 3A-3B, 3D, and 3F-3H, the standing seam clamp 102 includes an outer clamp member 304, an inner clamp member 306, and an outer support member 308. Referring to FIGS. 3G-3H, the outer clamp member 304 includes a side portion 310; a top portion 312, a clamp jaw portion 314, positioned below the top portion 312, and a shelf portion 316, positioned between the top portion 312 and the clamp jaw portion 314. The top portion 312, the clamp jaw portion 314, and the shelf portion 316 each projecting inwardly away from the side portion 310. The inner clamp member 306 includes a side portion 318, a top portion 320, and a clamp jaw portion 322 positioned below the top portion 320; each portion projecting inwardly away from the side portion 318. The outer support member 308 includes a side portion 324, and a top portion 326 projecting inwardly away from the side portion 324. The side portion 324 of the outer support member 308 and the side portion 318 of the inner clamp member 306 are adapted to receive a threaded fastener 328. The threaded fastener 328 and a retainer 330 secure the outer support member 308 and inner clamp member 306 together in a movable relationship. In FIG. 3G the threaded fastener 328 is received by an aperture 332 in side portion 324 of the outer support member 308, and by an aperture 334 in the side portion 318 of the inner clamp member 306. In the illustrated configuration, the aperture 332 in the side portion 324 of the outer support member 308 is non-threaded while the aperture 334 in the side portion 318 of the inner clamp member 306 is threaded to accept the threaded fastener 328. The threaded fastener 328 has a non-threaded portion proximate to the head of the fastener. The non-threaded portion of the threaded fastener 328 engages the aperture 332. In combination with the retainer 330, this arrangement allows the threaded fastener 328 to rotate freely with respect to outer support member 308 while moving the inner clamp member 306 linearly toward and away from outer support member 308. The retainer 330 is shown as a retaining ring. Any retainer suitable for holding the threaded fastener 328 in place linearly but allowing for rotational freedom can be used. For example, the retainer 330 can alternatively be a clevis pin, a hitch pin, a cotter pin, or a quick release pin. The threaded fastener 328 is also illustrated in FIGS. 3A-3D, and 3F. Referring again to FIG. 3G, the top portion 326 of the outer support member 308 can include an aperture 336 and the outer clamp member 304 can include an aperture or a recess 338 positioned and sized to receive a threaded fastener, such as a bolt or screw, for retaining roof top mounted equipment. The aperture 336 is also shown in FIGS. 3A-3C. The recess 338 is also shown in FIG. 3B.

Referring to FIG. 3B, the inner clamp member 306, the outer support member 308, the threaded fastener 328, and the retainer 330 together forms an outer clamp assembly 340. The top portion 326 of the outer support member 308 and the top portion 312 of the outer clamp member 304 are coupled in slideable cooperation thereby joining the outer clamp assembly 340 to the outer clamp member 304 and forming the standing seam clamp 102 shown in FIG. 3A. This slideable cooperation facilitates ease of assembly.

Referring to FIGS. 3G-3H, the slideable cooperation can be accomplished by a tongue and groove arrangement between the top portion 312 of the outer clamp member 304 and the top portion 326 of the outer support member 308. FIGS. 3G-3H show a plurality of tongues 342 projecting downward from the top portion 326 of the outer support member 308 and corresponding grooves 344 on the top surface of the top portion 312 of outer clamp member 304. Alternatively, the tongue and corresponding groove positions can be swapped. For example, the tongues 342 could be projecting upward from the top surface of the top portion 312 of the outer clamp member 304 and the corresponding groove portions could be positioned on the downward facing surface of the top portion 326 of the outer support member 308.

The combination of the outer clamp member 304, inner clamp member 306, and outer support member 308 are arranged so that the top portion 320 of the inner clamp member 306 is aligned and rests within a recess above the shelf portion 316 of the outer clamp member 304 and can be supported by the shelf portion 316 thereto. The clamp jaw portion 322 of the inner clamp member 306 and the clamp jaw portion 314 of the outer clamp member 304 can be arranged to align with each other. Illustrated are a complementary pattern of grooves on the clamping surfaces of clamp jaw portion 322 of the inner clamp member 306 and the clamp jaw portion 314 of the outer clamp member 304 to help facilitate securing the standing seam clamp 102 to a standing seam without slippage.

Figure 4A:
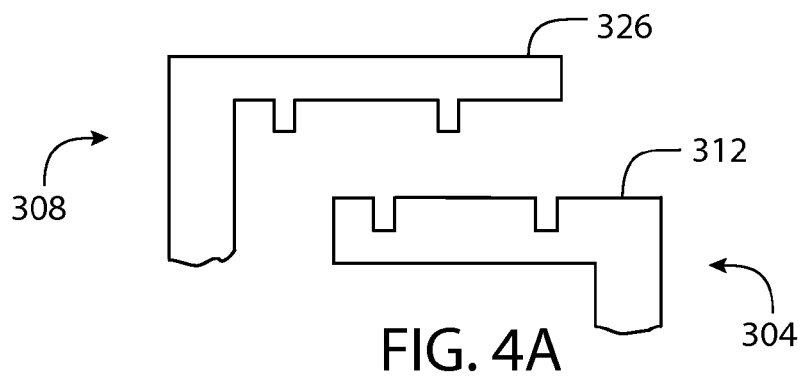
FIGS. 4A-4D show several alternative tongue and groove arrangement in slideable cooperation shown in side profile.
Figure 4B:
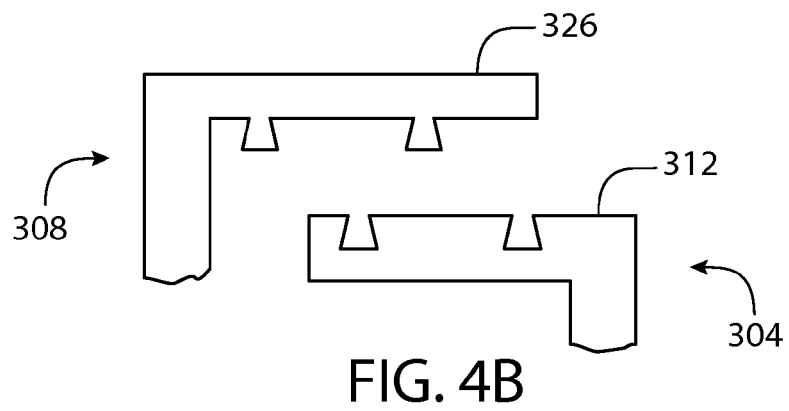
Figure 4C:
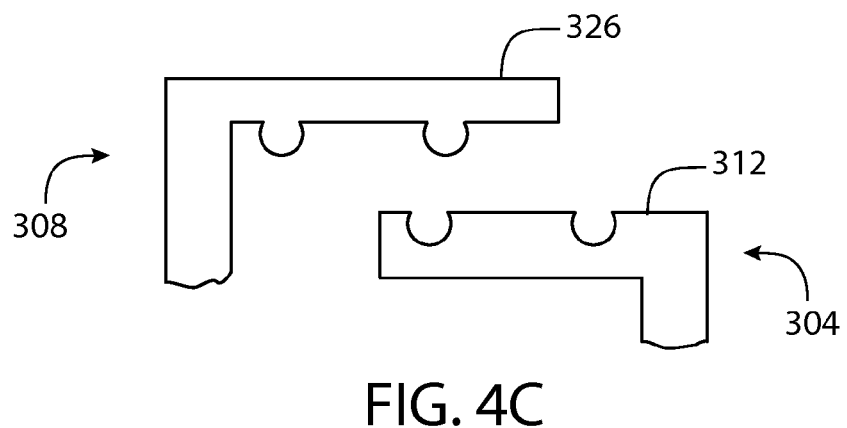
Figure 4D:
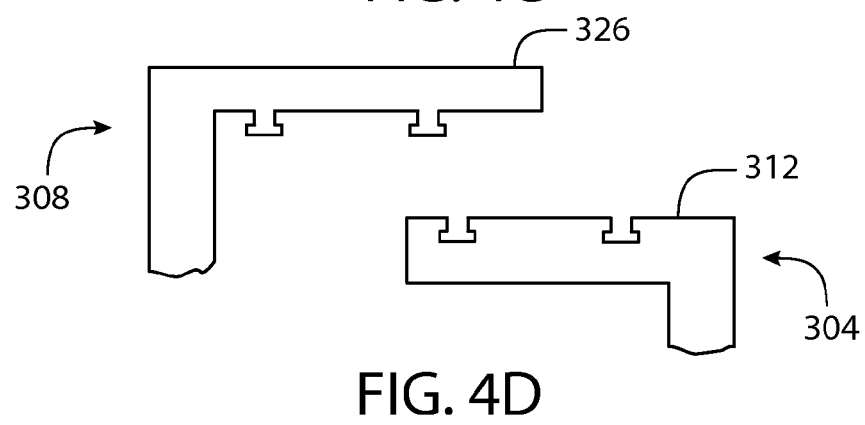

FIGS. 4A-4D show examples of tongue and groove arrangements, in profile, for facilitating slideable cooperation along the top portion 312 of the outer clamp member 304 and along the top portion 326 of the outer support member 308. FIG. 4A shows a tongue and a corresponding groove, the tongue and groove having complementary rectangular profiles. Using this arrangement, the outer clamp member 304 and the outer support member 308 can be assembled from either the top or side profile. The outer clamp member 304 and the outer support member 308 are not secured from lifting without the use of an additional fastener. It may be desirable to secure the outer clamp member 304 and the outer support member 308 together from lifting without the use of an additional fastener. FIGS. 4B-4D show a tongue and groove arrangement that can secure the outer clamp member 304 and the outer support member 308 in slideable captive cooperation. FIG. 4B shows the tongue and groove arrangement illustrated in the standing seam clamp 102 of FIGS. 3A-3H. The tongue and groove pair of FIG. 4B has a complementary trapezoidal profile. In each of the tongue and groove arrangements of FIGS. 4B-4D, the tongue and grooves are complementary in shape, with the base of the groove is wider than the surface opening of the groove. This arrangement allows for the outer clamp member 304 and the outer support member 308 to slideable along the groove with tongue being held captive within the groove.

As stated earlier in this disclosure, there are many styles of standing seam profiles. For example, an I-shaped seam profile, an L-shaped seam profile, a round or bulb-shaped seam profile, and a T-shaped seam profile. The standing seam clamp 102 of FIG. 3A can accommodate each of the above mentioned seam profiles by changing out one part, the outer clamp member 304. This can be advantageous in the manufacturer and inventory of seam clamps because the inner clamp member 306, outer support member 308, and the threaded fastener 328 can all be common parts and configured together as the outer clamp assembly 340.

Figure 5A:
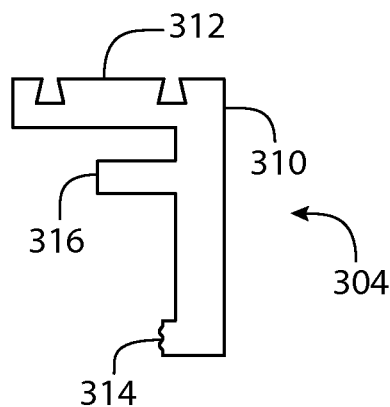
FIGS. 5A-5C show several alternative outer clamping members.
Figure 5B:
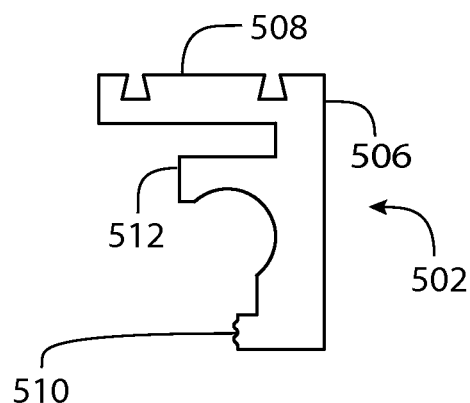
Figure 5C:
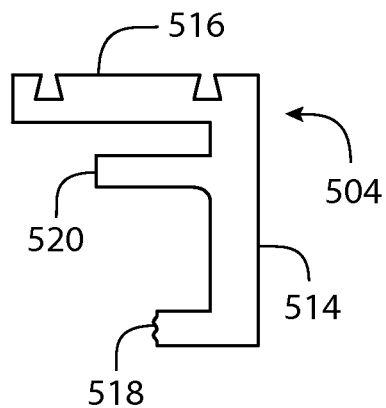

FIGS. 5A-5C show several alternative outer clamping members. The outer clamp member 304 of FIG. 5A was disclosed in FIG. 3A and can accommodate I-shaped, and L-shaped standing seam profiles. An outer clamp member 502 of FIG. 5B can accommodate bulb-shaped standing seam profiles. An outer clamp member 504 of FIG. 5C can accommodate T-shaped standing seam profiles. As previously disclosed, when discussing FIGS. 3G-3H, the outer clamp member 304 of FIG. 5A includes the side portion 310; the top portion 312, the clamp jaw portion 314, positioned below the top portion 312, and the shelf portion 316, positioned between the top portion 312 and the clamp jaw portion 314; and the top portion 312, the clamp jaw portion 314, and the shelf portion 316 each projecting inwardly away from the side portion 310. Similarly, the outer clamp member 502 of FIG. 5B includes a side portion 506, a top portion 508, a clamp jaw portion 510 positioned below the top portion 508, and a shelf portion 512 positioned between the top portion 508 and the clamp jaw portion 510; and the top portion 508, the clamp jaw portion 510, and the shelf portion 512 each projecting inwardly away from the side portion 506. The outer clamp member 504 of FIG. 5C also includes a side portion 514, a top portion 516, a clamp jaw portion 518 positioned below the top portion 516, and a shelf portion 520 positioned between the top portion 516 and the clamp jaw portion 518; and the top portion 516, the clamp jaw portion 518, and the shelf portion 520 each projecting inwardly away from the side portion 514.

Figure 6A:
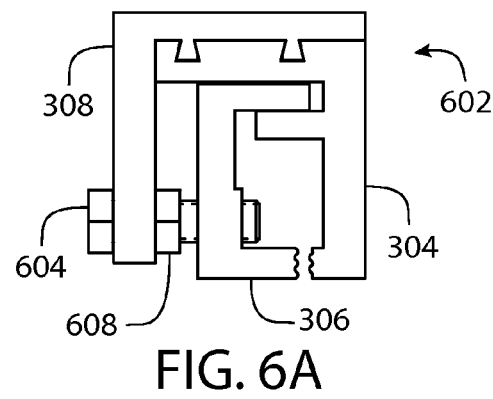
FIGS. 6A-6B show several views of the seam clamp of FIG. 1A with an alternative arrangement for adjusting the position of the inner clamp member.
Figure 6B:
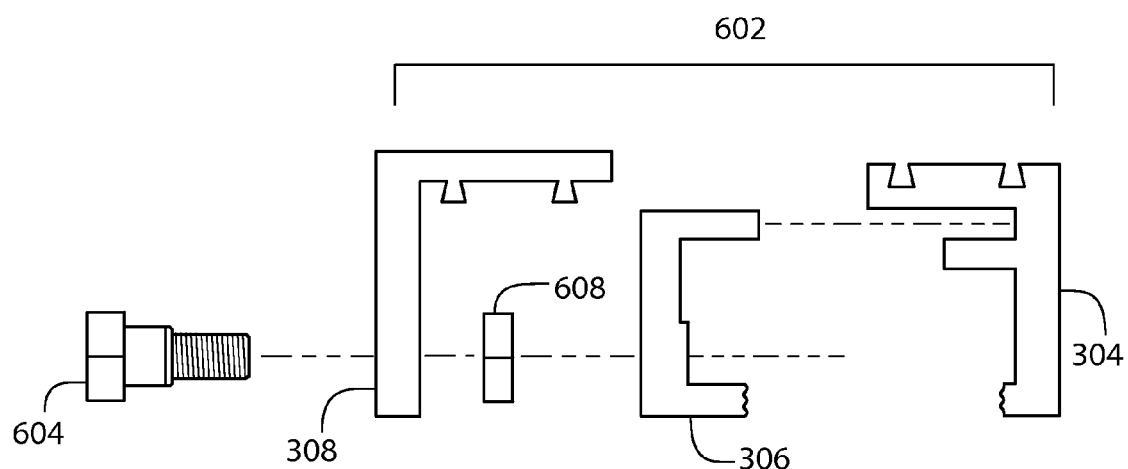

FIGS. 6A-6B show several views of the seam clamp 602 with an alternative arrangement for adjusting the position of the inner clamp member 306. FIG. 6A shows an assembled front view of the seam clamp 602. FIG. 6B shows a front exploded view of the seam clamp 602. Referring to FIGS. 6A-6B, the seam clamp 602 includes the outer clamp member 304, the inner clamp member 306, and the outer support member 308 in the same cooperative configuration as previously described. The threaded fastener 328 and the retainer 330 of FIG. 3G have been replaced in FIGS. 6A-6B by a threaded bolt 604 and a retainer in the form of a threaded nut 608. The threaded bolt 604 includes a non-threaded portion at least the thickness of the aperture 332 in side portion 324 of the outer support member 308 of FIG. 3G. In FIGS. 6A-6B, after the threaded bolt 604 engages the threaded nut 608, the non-threaded area is free to rotate within the aperture 332. This arrangement allows the threaded bolt 604 and threaded nut 608 to be retained by the outer support member 308 and the move the inner clamp member 306 either toward or away from outer support member 308 when the head of the threaded bolt 604 is turned.

Figure 7B:
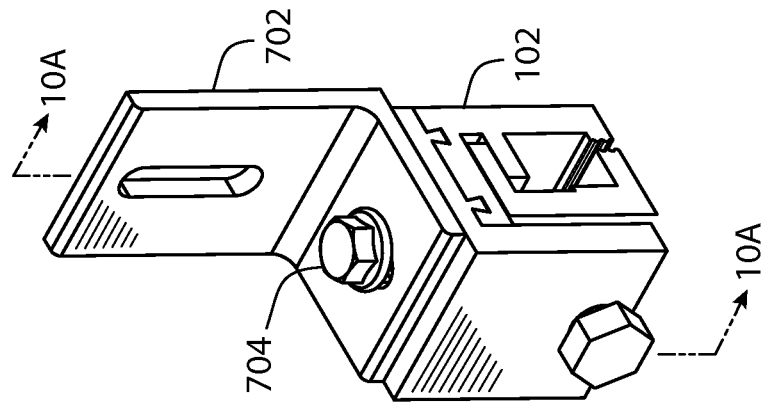
FIGS. 7A-7B show several views of the seam clamp of FIG. 1A in combination with an L-bracket for mounting equipment.
Figure 7A:
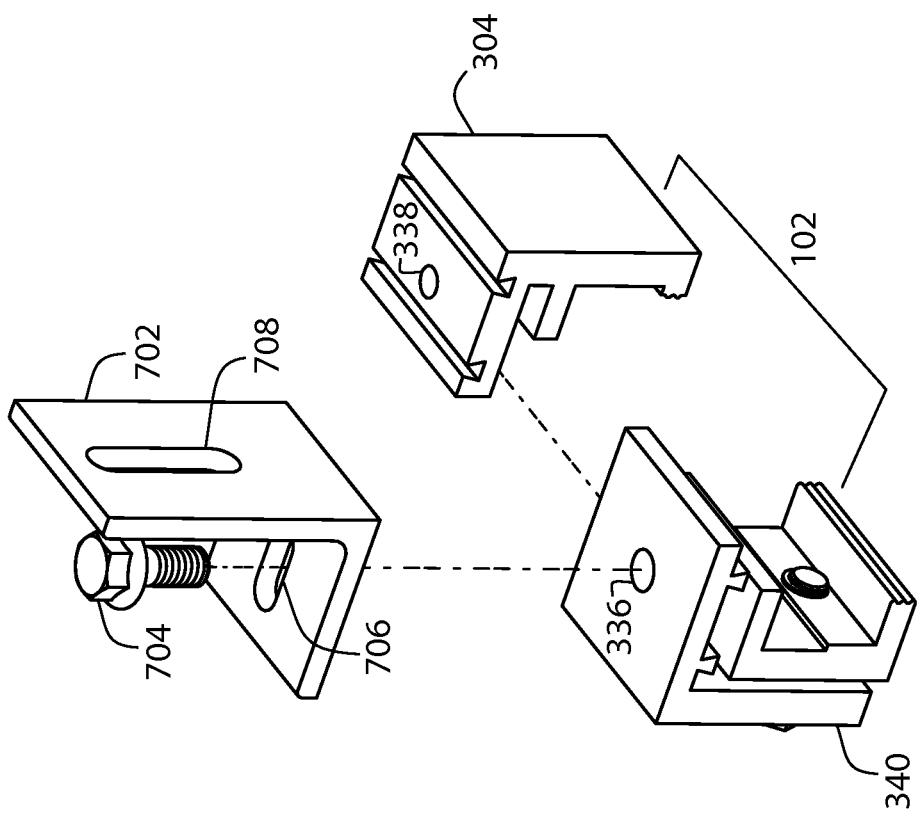
Figure 8:
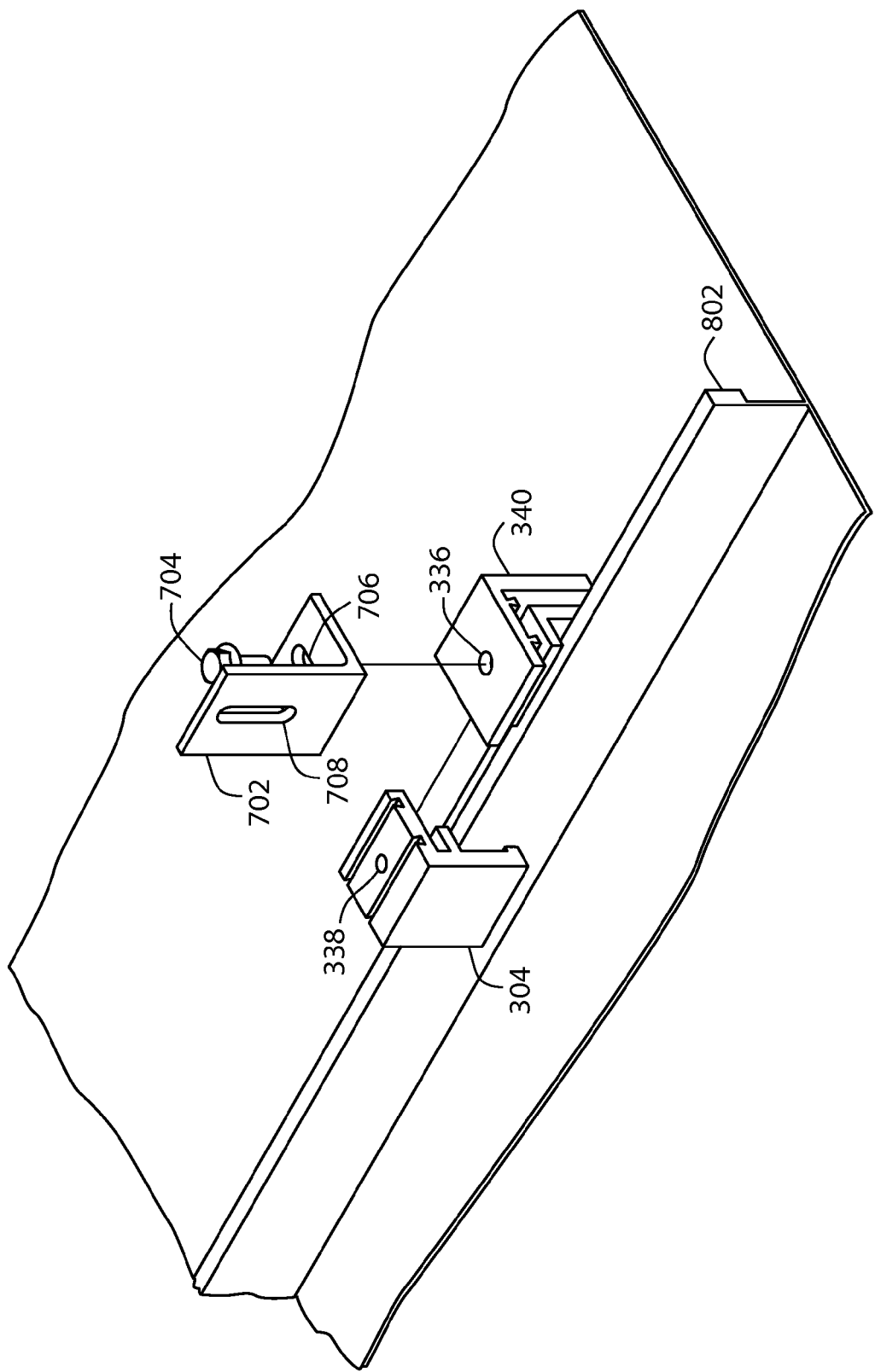
FIG. 8 shows a perspective partial assembled view of the seam clamp and L-bracket of FIGS. 7A-7B on an I-shaped standing seam roof.
Figure 9:
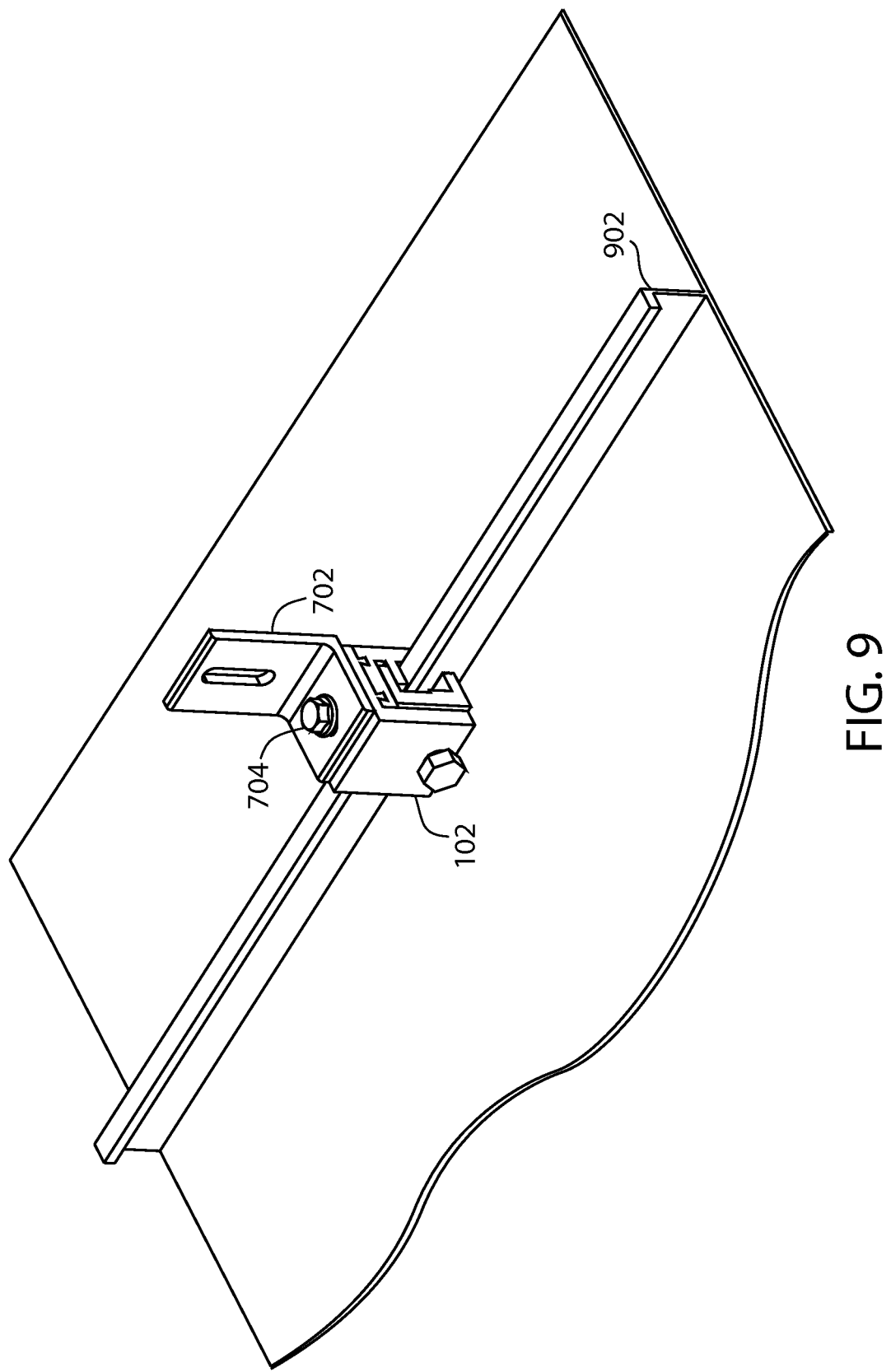
FIG. 9 shows a perspective view of the seam clamp and L-bracket of FIGS. 7A-7B secured to an L-shaped standing seam of a standing seam roof.

FIGS. 7A-B, FIG. 8, and FIG. 9 show several views of the standing seam clamp 102 assembly of FIG. 1A including an L-bracket 702 for mounting equipment, and a threaded fastener 704 for securing the L-bracket 702 to the standing seam clamp 102. FIG. 7A and FIG. 8 show a partially assembled view including the outer clamp assembly 340, the outer clamp member 304, the L-bracket 702, and the threaded fastener 704. The threaded fastener 704 secures the outer clamp assembly 340 and the outer clamp member 304 together by passing through the aperture 336 on the outer clamp assembly 340 and screwing into the recess 338 on outer clamp member 304. The L-bracket 702 includes a first slot 706 for passing through the threaded fastener 704 and a second slot 708 for passing through a fastener for securing roof top mounted equipment or a rail. In FIG. 8 the standing seam clamp 102 is shown in the process of being assembled and secured to double-lock type standing seam 802. In FIG. 9, the seam clamp assembly is secured to a L-shaped standing seam 902.

Figure 10A:
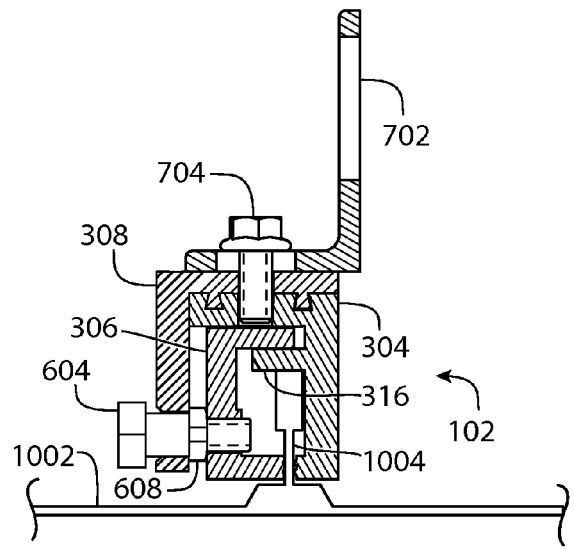
FIGS. 10A-10C show alternative seam clamps and L-brackets in front view showing secured to standing seam roofs using the alternative outer clamping members of FIGS. 5A-5C respectively.
Figure 10C:
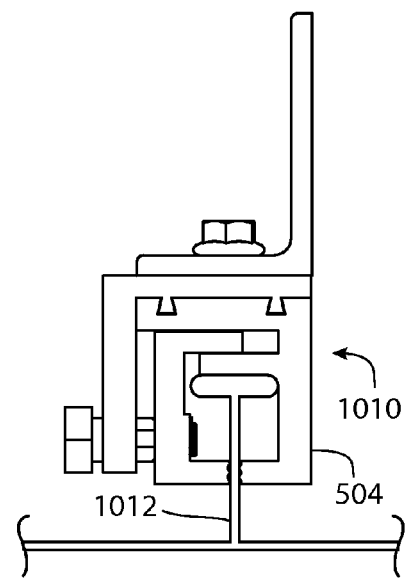
Figure 10B:
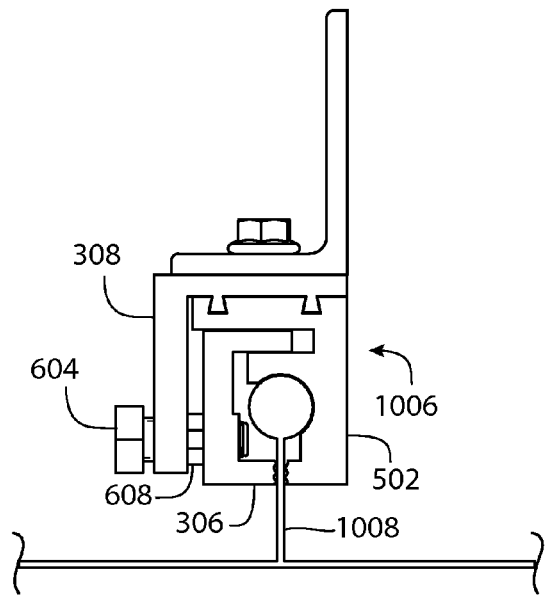

FIGS. 10A-10C show alternative seam clamps and L-brackets in front view showing secured to standing seam roofs using the alternative outer clamping members of FIGS. 5A-5C respectively. FIG. 10A shows standing seam clamp 102 including the L-bracket 702. FIG. 10A is shown in a front sectional view of FIG. 7B. The standing seam clamp 102 is secured to a standing seam roof 1002 with an I-shaped standing seam 1004. As previously disclosed, the tongue and groove arrangement between the outer clamp member 304 and the outer support member 308 can be configured for in a slideable captive configuration where one degree of freedom, i.e. movement along the length of the tongue and groove, is permitted. The threaded fastener 704 secures the L-bracket

702 to both the outer clamp member 304 and the outer support member 308 removing this one degree of freedom and securing the clamp the threaded fastener 704 secures the L-bracket 702 to both the outer clamp member 304 and the outer support member 308 together. The inner clamp member 306 is movable by turning the threaded bolt 604 and the threaded bolts is retained to the outer support member 308 by the threaded nut 608, as previously disclosed. The inner clamp member 306 is shown pushed against the side of the I-shaped standing seam 1004 of the standing seam roof 1002. The shelf portion 316 of the outer clamp member 304 is positioned above the top of the I-shaped standing seam 1004 and can be used to support the standing seam clamp 102 on top of the standing seamed if desired.

FIG. 10B shows a seam clamp 1006 secured to a round or bulb shaped standing seam 1008. The seam clamp 1006 includes the inner clamp member 306, the outer support member 308, the threaded bolt 604 and the threaded nut 608. To facilitate use of the seam clamp 1006 with bulb shaped standing seam 1008, the outer clamp member 502 is used in place of the outer clamp member 304 of FIG. 10A. Similarly, in FIG. 10C, to facilitate use of a standing seam clamp 1010 with a T-shaped standing seam 1012, the outer clamp member 504 is used in place of outer clamp member 304 of FIG. 10A or 502 of FIG. 10B.

Figure 11:
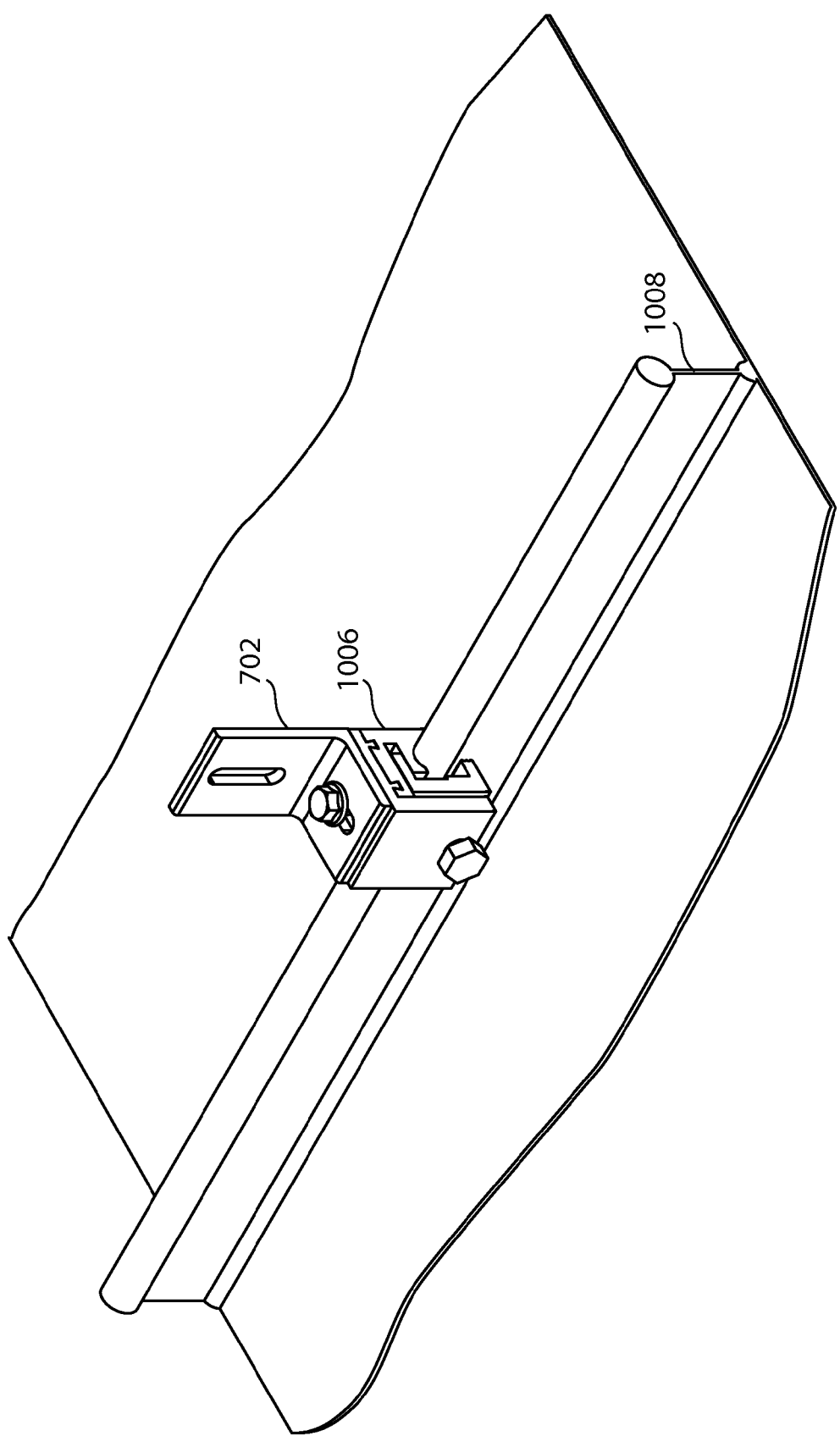
FIG. 11 shows a perspective view of the seam clamp and L-bracket assembly of FIG. 10B secured to a round shaped standing seam.
Figure 12:
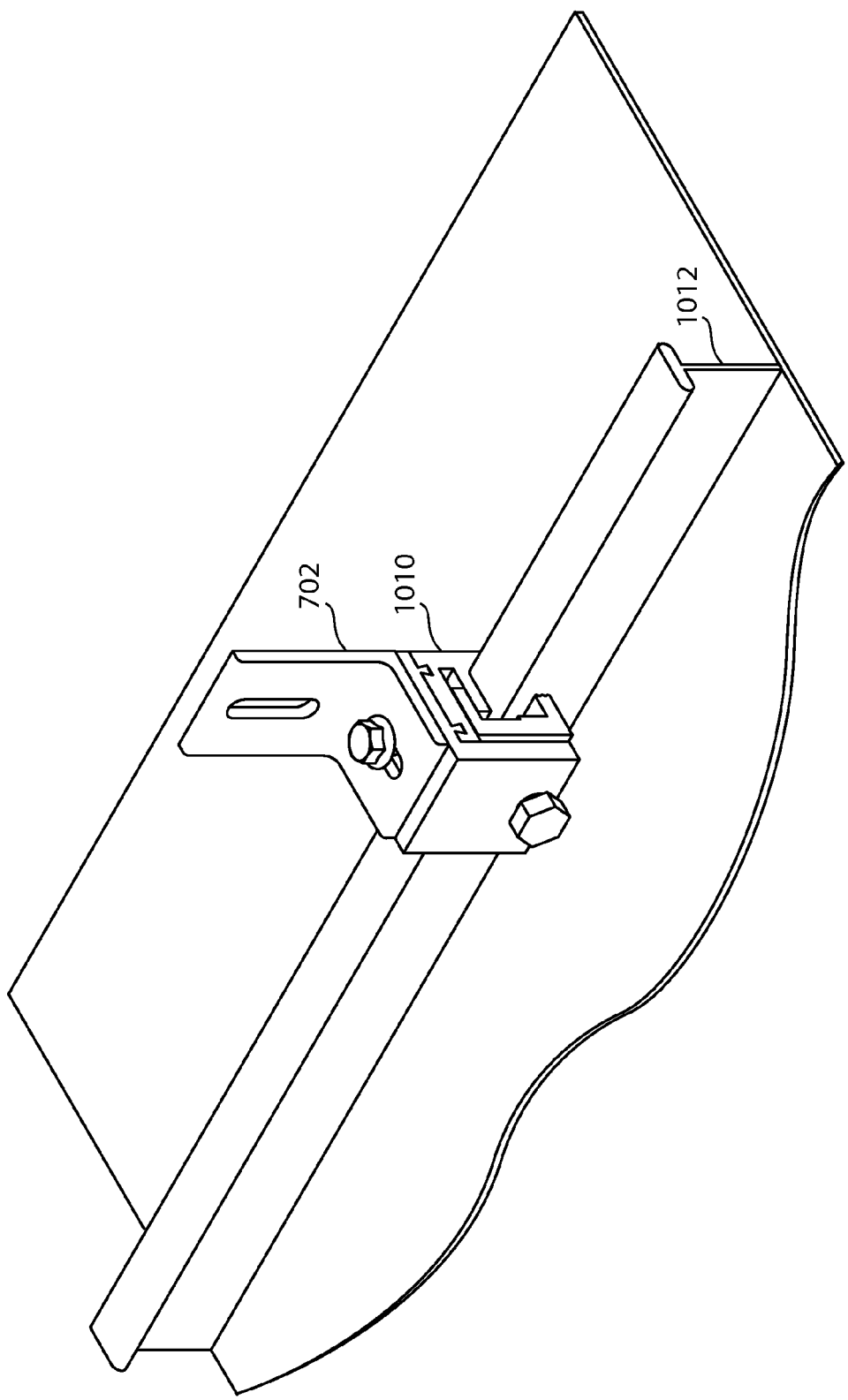
FIG. 12 shows a perspective view of the standing seam clamp and L-bracket assembly of FIG. 10C secured to a T-shaped standing seam.

FIG. 11 shows a perspective view of the seam clamp 1006 of FIG. 10B and L-bracket 702 secured to the bulb shaped standing seam 1008. FIG. 12 shows a perspective view of the standing seam clamp 1010 of FIG. 10C and the L-bracket 702 secured to the T-shaped standing seam 1012.

Figure 13A:
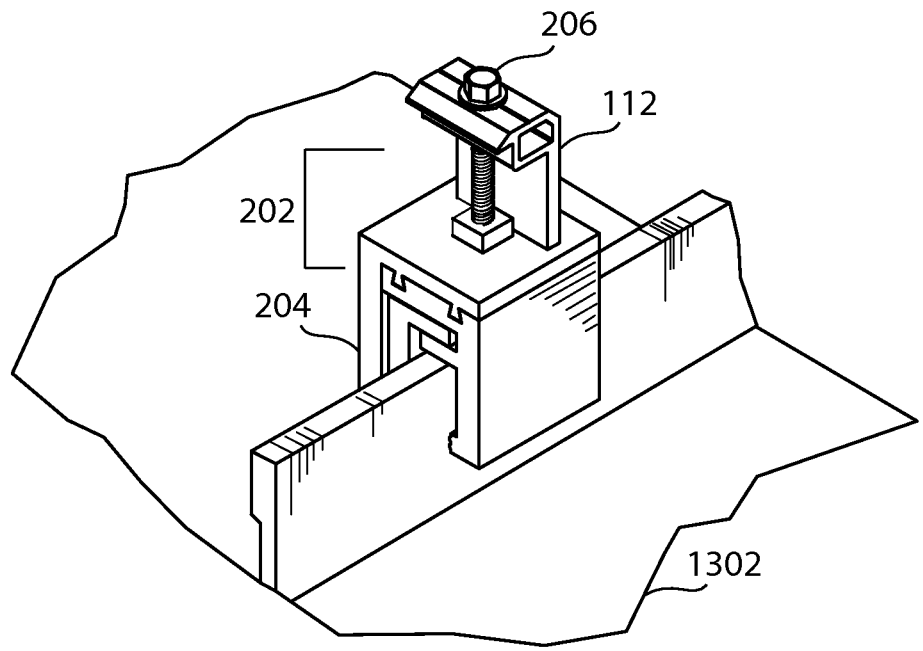
FIG. 13A shows the standing seam clamp of FIG. 2A assembled with a solar panel end clamp; the standing seam clamp is secured to a standing seam roof.

The standing seam roof equipment mounting apparatus 202 of FIG. 2B, as previously disclosed, can be use to secure the solar PV panel 106 to a standing seam roof without any need for a rail or other intermediary brackets. FIG. 13A shows the standing seam roof equipment mounting apparatus 202 secured to a standing seam roof 1302. The standing seam roof equipment mounting apparatus 202 includes the seam clamp 204, threaded fastener 206, and the solar panel end clamp 112. The solar panel end clamp 112 is secured to the seam clamp 204 by the threaded fastener 206.

Figure 13B:
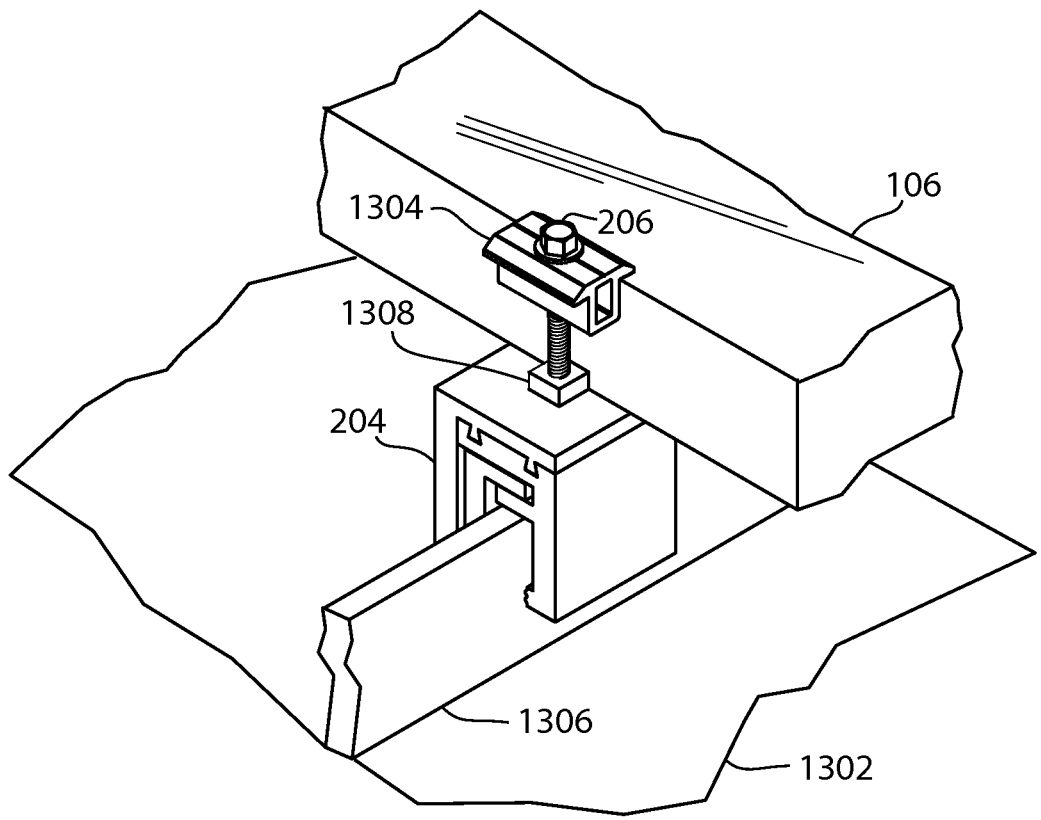
FIG. 13B shows the standing seam clamp of FIG. 2A assembled with a solar panel mid clamp and solar panel; the standing seam clamp is secured to a standing seam roof.

FIG. 13B shows the seam clamp 204 of FIG. 2B assembled with a solar panel mid clamp 1304 and the solar PV panel 106; the seam clamp 204 is secured to the standing seam 1306 of a standing seam roof 1302. The solar PV panel 106 rests on the top surface of the seam clamp 204 and is aligned in proper position and orientation by an alignment projection 1308. Using a square shape for the alignment projection 1308, as illustrated, the solar PV panel 106 can be aligned either perpendicular or parallel to the direction of the standing seams.

Figure 14A:
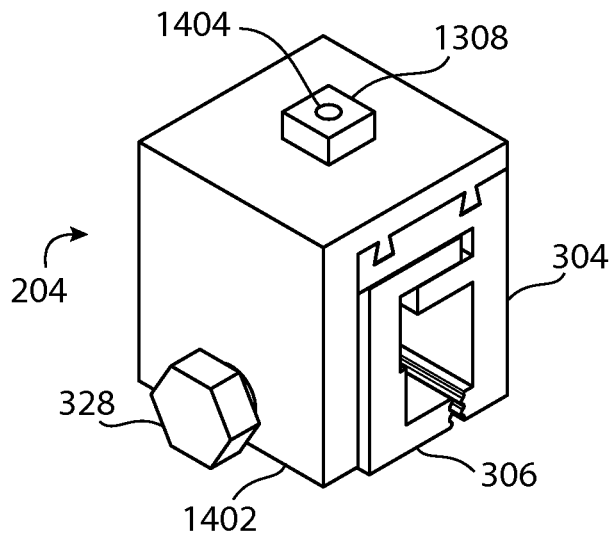
FIGS. 14A-14H shows in several views the seam clamp of FIG. 2A.
Figure 14B:
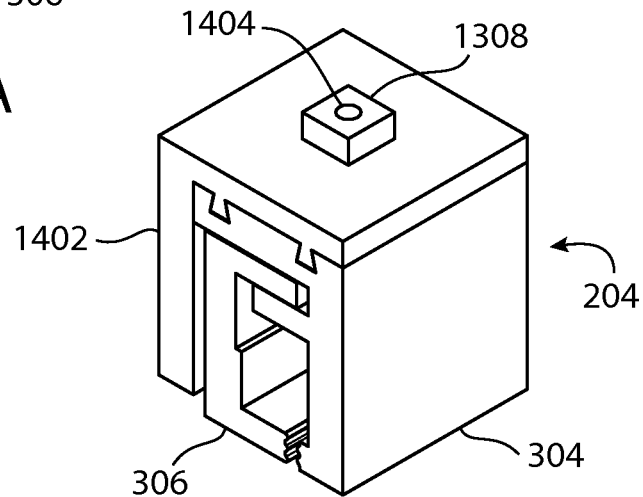
Figure 14C:
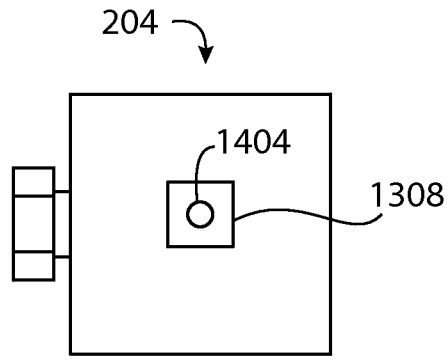
Figure 14D:
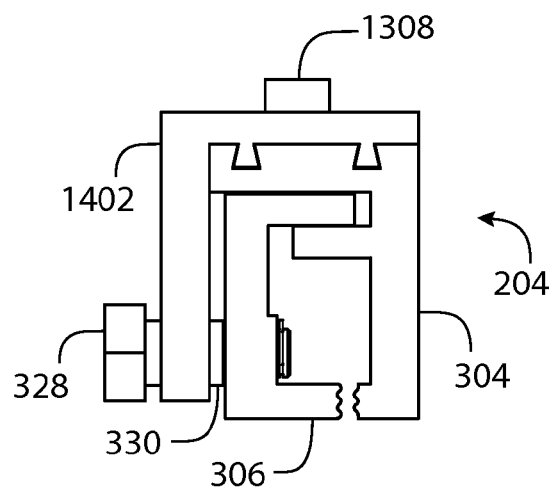
Figure 14E:
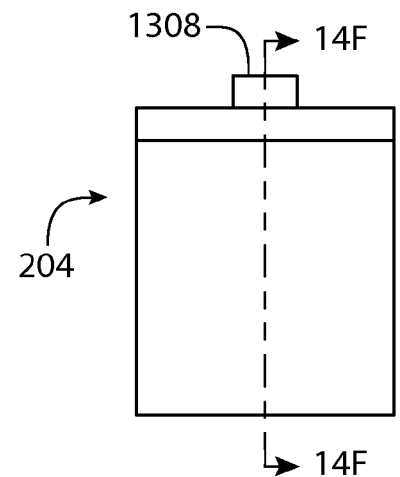
Figure 14F:
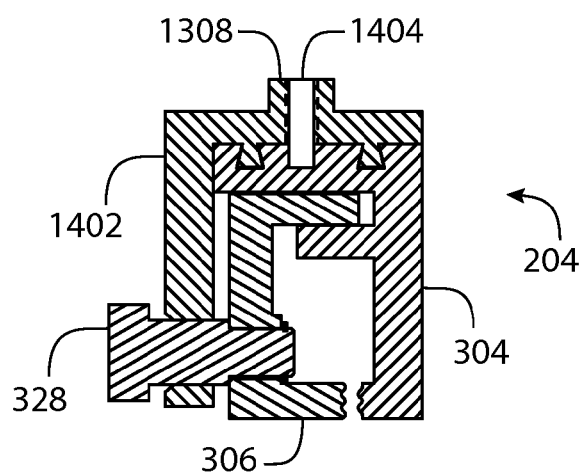
Figure 14G:
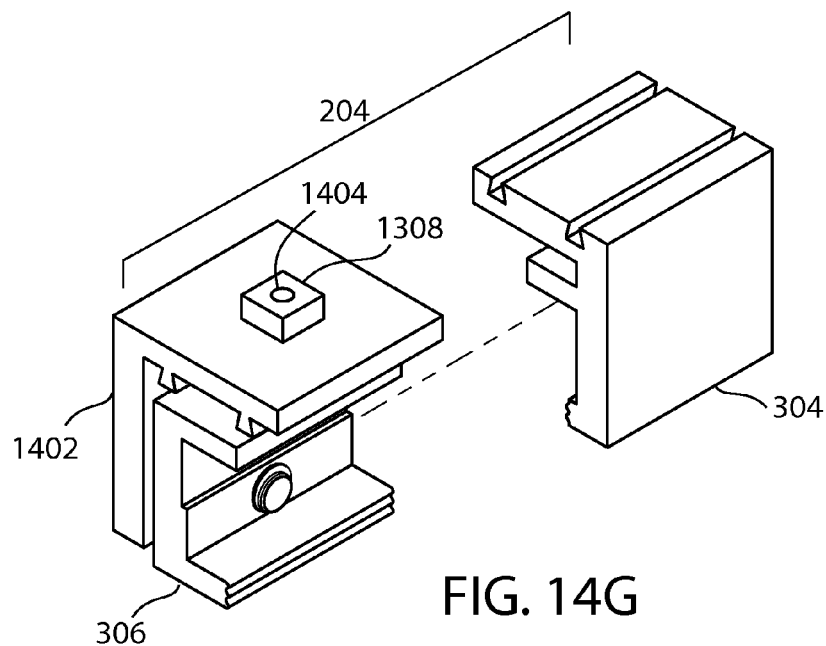
Figure 14H:
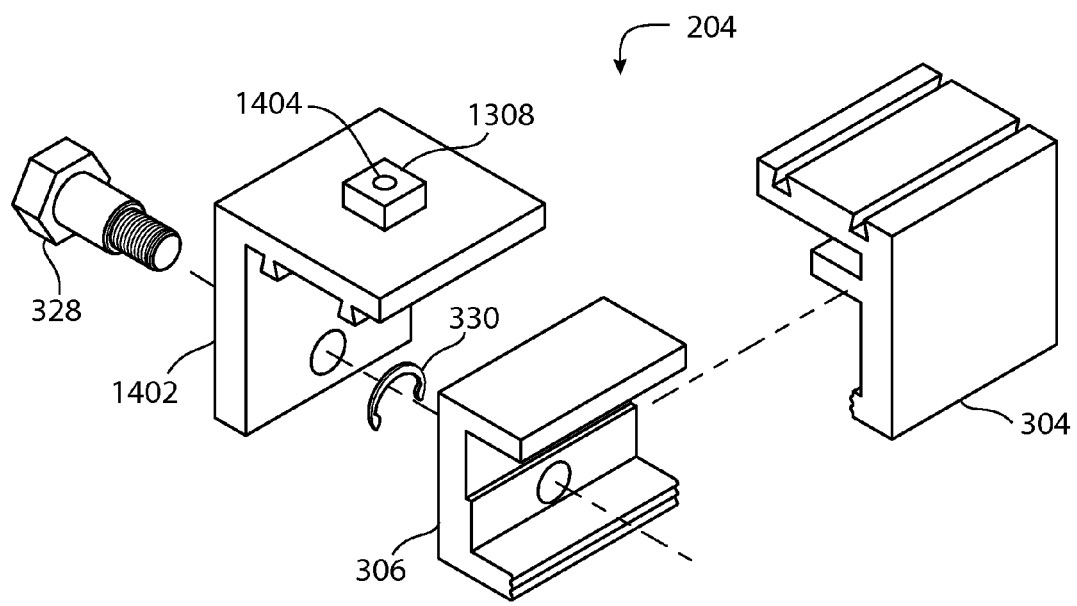

FIGS. 14A-14H shows in several views the seam clamp 204 of FIG. 2A. FIG. 14A shows the seam clamp 204 in left side perspective view, FIG. 14B shows the seam clamp 204 in front perspective view, FIG. 14C the seam clamp 204 in top view, FIG. 14D the seam clamp 204 in front profile view, FIG. 14E shows the seam clamp 204 in right side view. FIG. 14F shows the seam clamp 204 in sectional view of FIG. 14E. FIG. 14G shows the seam clamp 204 in a partially assembled view. FIG. 14H shows the seam clamp 204 in exploded perspective view.

The clamping mechanism of the seam clamp 204 operates in the same manner as previously described for the standing seam clamp 102 of FIG. 3A. The difference in construction of the seam clamp 204 of FIGS. 14A-14H and the standing seam clamp 102 of FIG. 3A is mainly the addition of the alignment projection 1308 of FIGS. 14A-14H. FIGS. 14A, 14D, and 14F-14H show the outer clamp member 304, inner clamp member 306, the threaded fastener 328, and an outer support member 1402. FIGS. 14D and 14H show the retainer 330. FIG. 14B shows the outer clamp member 304, the inner clamp member 306 and the outer support member 1402. The outer clamp member 304, inner clamp member 306, the threaded fastener 328, outer support member 1402 of FIGS. 14A, 14D, and 14F-14H, and the retainer 430 of FIGS. 14D and 14H all have the cooperative relationship and operate in the same manner as described for the outer clamp member 304, inner clamp member 306, the outer support member 308, the threaded fastener 328, and the retainer 330 as described for FIGS. 3G-H.

FIGS. 14A-14C, and 14F-14H, show a recess 1404 through the top portion of the alignment projection 1308. The recess 1404 is threaded to receive the threaded fastener 206, and secure the solar panel end clamp 112 of FIG. 13A or the threaded fastener 206, and secure the solar panel mid clamp 1304 of FIG. 13B. The threaded fastener 206 of FIGS. 13A-13B engages the recess 1404 shown in FIG. 14F and secures the outer clamp member 304 to the outer support member 1402.

The seam clamp 204 of FIGS. 14A-14H can be configured to secure several types of standing seam shapes. The outer clamp member 304 can accommodate, for example, L-shaped, I-shaped, overlap, single lock, and double lock types. The outer clamp member 502 of FIG. 5B can be used in place of the outer clamp member 304 to secure bulb shaped or round shaped standing seams. The outer clamp member 504 of FIG. 5C can be used to secure t-shaped standing seams.

The outer clamp member 304 and the outer support member 1402 shown in 14A-14B, 14D, and 14F-14H can be configured to be engaged in slideable cooperation by a tongue and groove arrangement as described previously and shown in FIG. 4A. The outer clamp member 304 and the outer support member 1402 shown in 14A-14B, 14D, and 14F-14H can be configured to be engaged in slideable captive cooperation by a tongue and groove arrangement as described previously and shown in FIGS. 4B-4D.

Figure 15A:
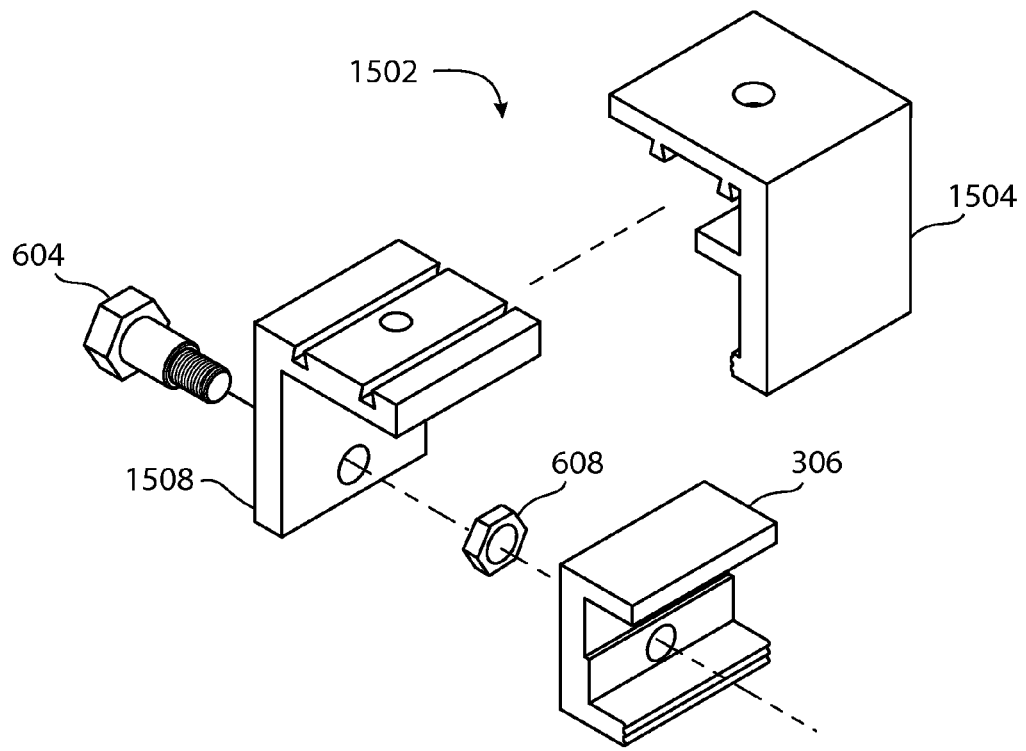
FIGS. 15A-15B show a seam clamp with an alternative arrangement of elements.
Figure 15B:
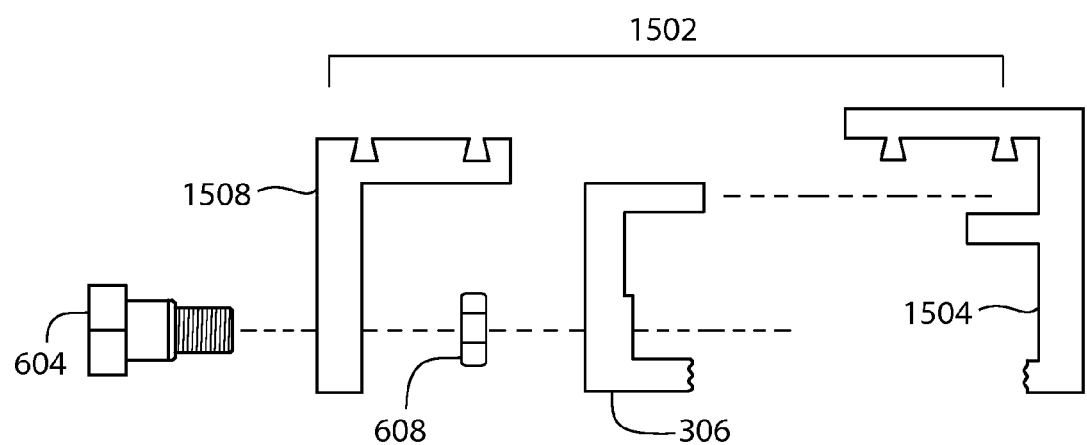

The outer support member 308 of the standing seam clamp 102 of FIG. 3A and the outer support member 1402 of seam clamp 204 of FIG. 14A are configured to include the top outer surface of the seam clamps. It is possible to configure the outer clamp members to include the top outer surface of the seam clamps. FIGS. 15A-15B shows a seam clamp 1502 with an alternative arrangement of elements where outer clamp member 1504 in configured to include the top outer surface of the seam clamp 1502. The inner clamp member 306, the threaded bolt 604, and the threaded nut 608 engage the outer clamp member 1504 and an outer support member 1508 in a similar manner as previously described.

Figure 16:
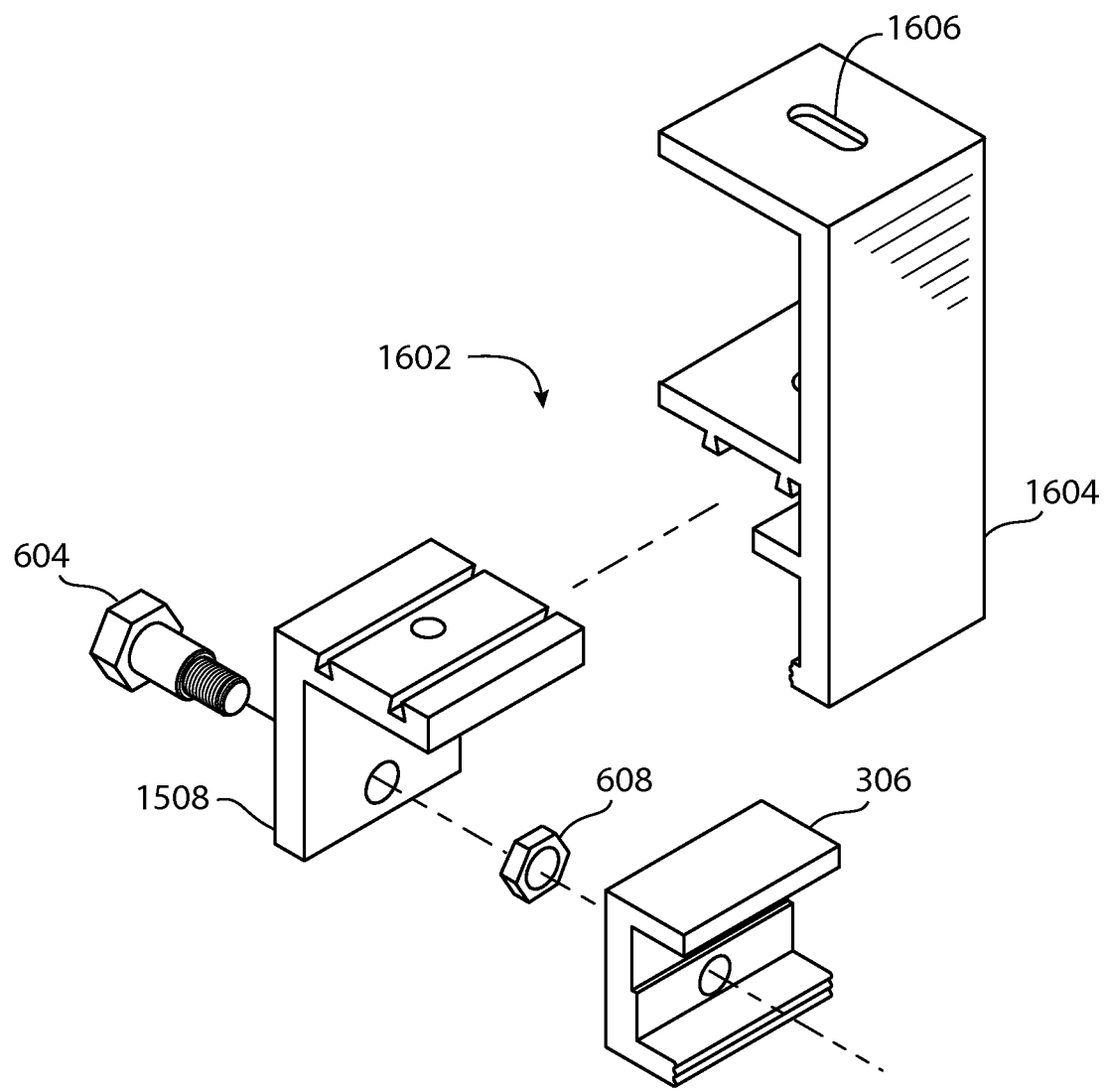
FIG. 16 shows a seam clamp, in exploded perspective view, with an inverted L-bracket integrated into an outer bracket member.

FIG. 16 shows a seam clamp 1602, in exploded perspective view, with an inverted L-bracket integrated into an outer bracket member 1604. The outer bracket member 1604 cooperatively engages the outer support member 1508 as previously described. The outer support member 1508 adjustably engages the inner clamp member 306 using the threaded bolt 604 as previously described, with the threaded nut 608 captivity holding the threaded bolt 604. The top of the inverted L-bracket portion includes a slot 1606 for receiving and holding a fastener for either directly engaging roof mounted equipment, or engaging roof mounting equipment indirectly through an intermediary such as the mounting rail 108 of FIG. 1C.

Figure 17:
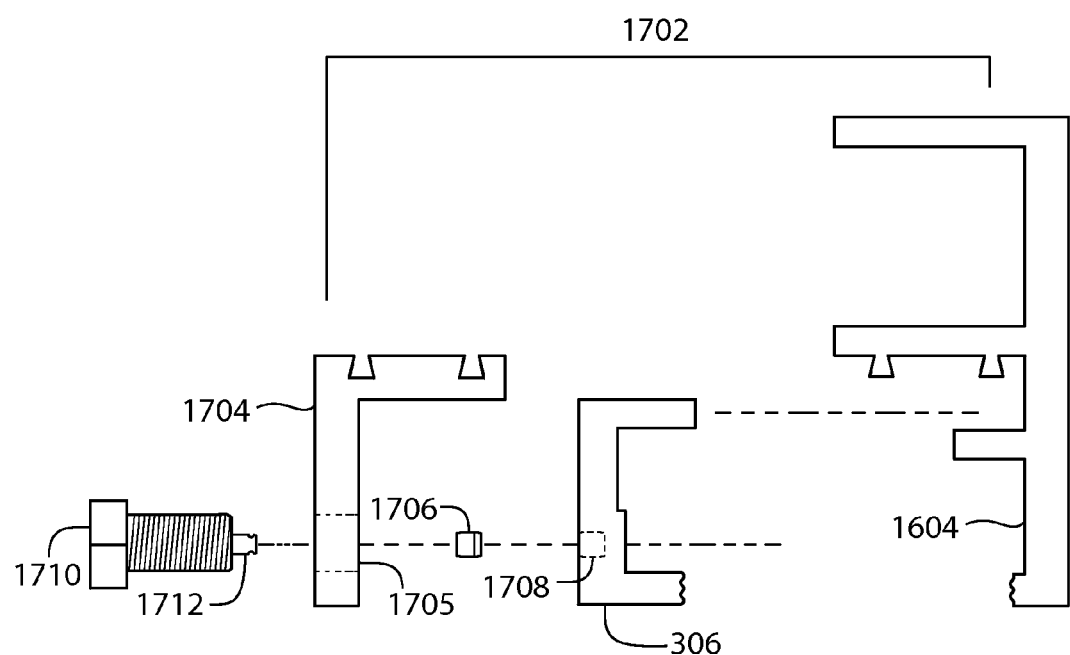
FIG. 17 shows a side exploded view of a seam clamp. The seam clamp includes the outer bracket member with the integrated inverted L-bracket.

FIG. 17 shows a side exploded view of a seam clamp 1702. The seam clamp 1702 includes the outer bracket member 1604 with the integrated inverted L-bracket. The seam clamp 1702 includes an outer support member 1704 that includes a threaded aperture 1705 indicated by broken lines. The inner clamp member 306 is adjustably engaged to the outer support member 1704. A threaded fastener 1710 includes a non-threaded portion 1712 forming the tip of the fastener. The non-threaded portion 1712 includes a groove for receiving a retainer clip. A spring clip bushing 1706 is inserted into a recess 1708 in the inner clamp member 306. The recess 1708 is adapted to receive and hold the spring clip bushing 1706. The non-threaded portion 1712 of the threaded fastener 1710 can be captivity engaged by the spring clip bushing 1706 within the inner clamp member 306 but free to rotate. This arrangement allows the threaded fastener 1710 to captivity engages both outer support member 1704 and the inner clamp member 306, allowing the inner clamp member 306 to move toward and away from the outer support member 1704 as the threaded fastener 1710 is rotated.

Figure 18:
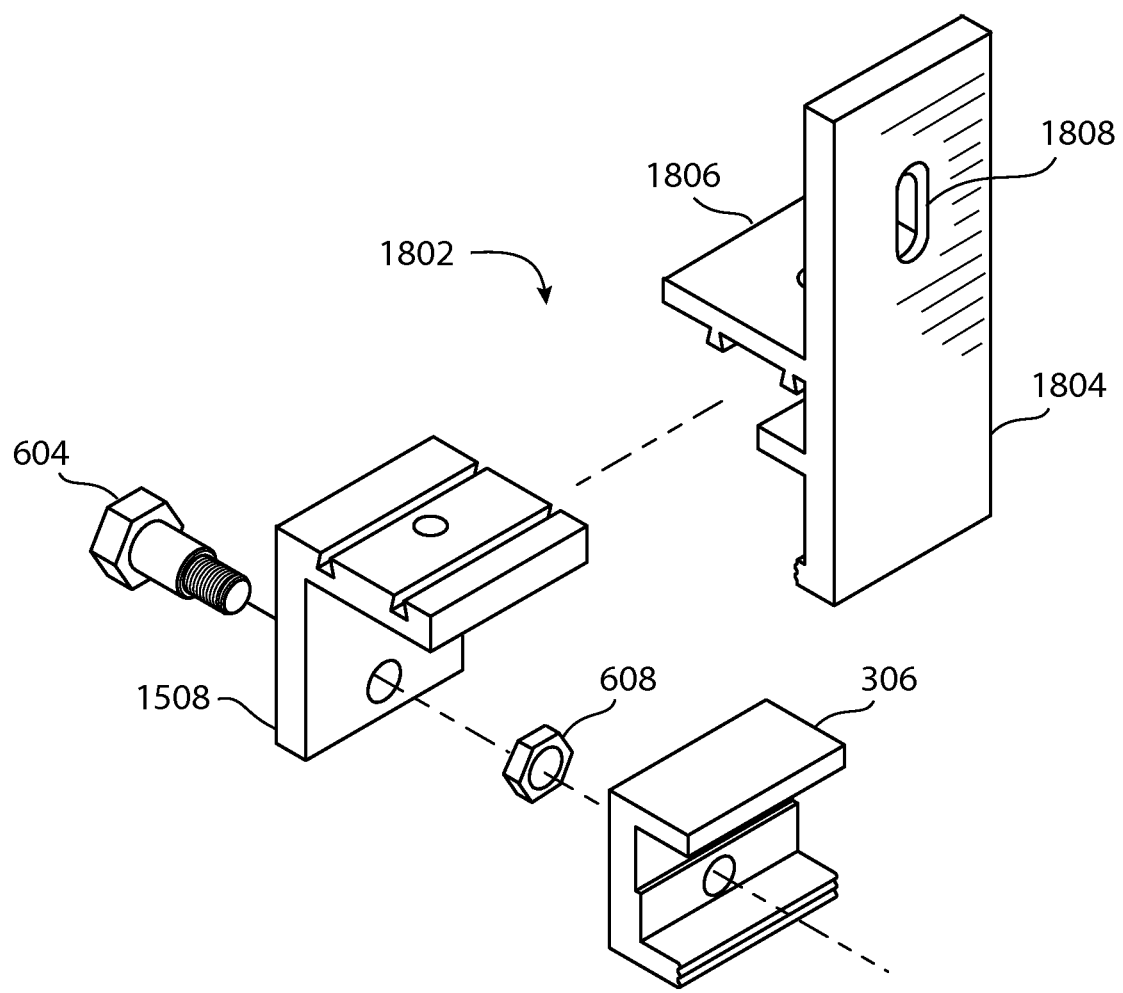
FIG. 18 shows a seam clamp, in exploded perspective view, with a back portion that projects vertically above the horizontal top seating portion.

FIG. 18 shows a seam clamp 1802 including an outer clamp member 1804, the outer support member 1508, the threaded bolt 604, the threaded nut 608, and inner clamp member 306. The outer clamp member 1804 includes a back portion that projects vertically above the horizontal top seating surface 1806 of the seam clamp 1802. The back portion includes a slot 1808 for receiving a fastener to secure the seam clamp 1802 directly to a rail. The seam clamp 1802 is cooperatively configured, as previously described, with the outer support member 1508 and the outer clamp member 1804 engagable in slideable captive cooperation by a tongue and groove arrangement. The inner clamp member 306 and the outer support member 1508 are adjustably engaged through the combination of the threaded bolt 604 and the threaded nut 608 as previously described.

A standing seam roof clamp and a standing seam roof equipment mounting apparatus have been described. It is not the intent of this disclosure to limit the claimed invention to the examples, and variations described in the specification. Those skilled in the art will recognize that variations will occur when embodying the claimed invention in specific implementations and environments. For example, it is possible to implement certain features described in separate embodiments in combination within a single embodiment.

Similarly, it is possible to implement certain features described in single embodiments either separately or in combination in multiple embodiments. For example, the manner of adjustable cooperation described between the various inner clamp members and outer clamp members can easily be exchanged in the various disclosed seam clamps. As a further example, the features disclosed for mounting the various seam clamps to external equipment can be exchange or combined with other features demonstrated.

It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. An apparatus, comprising:
   a first outer member including a first side portion and a first plurality of portions that extend in a first direction from said first side portion, wherein said first plurality of portions comprises:
      a first top portion;
      a first jaw clamp element configured with a first set of projections; and
      a shelf portion located between said first top portion and said first jaw clamp element;
   a second outer member including a second side portion and a second top portion extending from said second side portion in a second direction that is substantially opposite to said first direction;
   a tongue and groove arrangement for moveably engaging, in a third direction substantially orthogonal to said first direction, said first top portion with said second top portion;
   an inner member including a third side portion and a second plurality of portions that extend in said second direction from said third side portion, wherein said second plurality of portions comprises:
      a third top portion movably located between said first top portion and said shelf portion; and
      a second jaw clamp element configured with a second set of projections facing said first set of projections; and
   a fastener configured to effect movement of said third side portion toward and away from said second side portion.

2. The apparatus of claim 1, wherein said first plurality of portions extend substantially orthogonally in said first direction.

3. The apparatus of claim 1, wherein said shelf portion is the only shelf portion of said first plurality of portions.

4. The apparatus of claim 1, wherein said second top portion extends substantially orthogonally from said second side portion.

5. The apparatus of claim 1, wherein said first top portion and said second top portion are in direct contact.

6. The apparatus of claim 1, wherein said tongue is located in one of said first top portion or said second top portion and wherein said groove is located in the one of said first top portion or said second top portion in which said tongue is not located.

7. The apparatus of claim 1, wherein said second direction is substantially orthogonal to said third side portion, wherein said second plurality of portions extend in said second direction from said third side portion.

8. The apparatus of claim 1, wherein said third top portion is in direct contact with said first top portion and said shelf portion.

9. The apparatus of claim 1, wherein both of said first set of projections and said second set of projections comprise peaks and valleys.

10. The apparatus of claim 1, wherein said second set of projections are the only projections on said second jaw clamp.

11. The apparatus of claim 10, wherein said first direction is substantially orthogonal to said first side portion.

12. The apparatus of claim 10, wherein said second direction is substantially orthogonal to said second side portion, wherein said third direction substantially orthogonal to said first direction and said second direction.

13. The apparatus of claim 10, wherein said tongue is located in one of said first top portion or said second top portion and wherein said groove is located in the one of said first top portion or said second top portion in which said tongue is not located.

14. The apparatus of claim 10, wherein said fastener comprises a through hole in said second side portion, a threaded hole in said third side portion, and a head and a shaft extending from said head to a terminal end, wherein said shaft has a non-threaded portion proximate to said head and a threaded portion proximate to said terminal end, wherein said shaft extends through said through-hole such that only said non-threaded portion is within said through-hole and wherein said threaded portion is threaded into said threaded hole, and a retainer fixedly attached between said second between said non-threaded portion and said threaded portion to fix said head next to said second side portion.

15. The apparatus of claim 10, wherein said projections have peaks and valleys.

16. An apparatus, comprising:
a first outer member comprising:
   a first side portion with a first end and a second end;
   a first top portion that extends in a first direction from said first end;
   a first jaw clamp element that extends from said second end and is configured with first projections substantially facing said first direction; and
   a shelf portion between said first end and said second end, wherein said shelf portion extends from said first side portion in said first direction;
a second outer member comprising:
   a second side portion having a third end and a fourth end; and
   a second top portion that extends in a second direction from said third end, wherein said first direction is opposite to said second direction;
   a tongue and groove arrangement for moveably engaging, in a third direction other than said first direction and said second direction, said first top portion with said second top portion;
an inner member comprising:
   a third side portion having as fifth end, a sixth end;
   a third top portion that extends away from said fifth end in said second direction; and
   a second jaw clamp element at said sixth end and configured a second set of projections, wherein said second set of projections are entirely and substantially facing only in said second direction; and
a fastener configured to effect movement of said third side portion toward and away from said second side portion,
wherein said third top portion is in contact with and is slidably located between said first top portion and said shelf portion, wherein said first projections face said second projections.

17. An apparatus, comprising:
a first outer member including a first side portion and a first plurality of portions that extend substantially orthogonally in a first direction from said first side portion, wherein said first plurality of portions comprises:
   a first top portion;
   a first jaw clamp element configured with a first set of projections; and
   only one shelf portion located between said first top portion and said first jaw clamp element;
a second outer member including a second side portion and a second top portion extending substantially orthogonally from said second side portion in a second direction that is substantially opposite to said first direction, wherein said first top portion and said second top portion are in direct contact;
a tongue and groove arrangement for moveably engaging, in a third direction substantially orthogonal to said first direction, said first top portion with said second top portion, wherein said tongue is located in one of said first top portion or said second top portion and wherein said groove is located in the one of said first top portion or said second top portion in which said tongue is not located;
an inner member including a third side portion and a second plurality of portions that extend substantially orthogonally in said second direction from said third side portion, wherein said second plurality of portions comprises:
   a third top portion movably located between, and in direct contact with, said first top portion and said shelf portion; and
   a second jaw clamp element configured with a second set of projections, wherein said second set of projections are the only projections on said second jaw clamp and all of the projections of said second set of projections face said first set of projections; and
a fastener configured to effect movement of said third side portion toward and away from said second side portion.

18. An apparatus, comprising:
a first outer member (304) comprising:
   a first side portion (310) with a first end and a second end;
   a first top portion (312) that extends in a first direction from said first end, wherein said first direction is not parallel with said first side portion;
   a first jaw clamp element (314) that extends from said second end and is configured with first projections substantially facing said first direction; and
   a shelf portion (316) between said first end and said second end, wherein said shelf portion extends from said first site portion in said first direction;
a second outer member (308) comprising
   a second side portion (324) having a third end and a fourth end; and
   a second top portion (326) that extends in a second direction from said third end, wherein said second direction is not parallel with said second side portion, wherein said first direction is opposite to said second direction;
   a tongue and groove arrangement (342, 344) for moveably engaging, in a third direction substantially orthogonal to said first direction and said second direction, said first top portion with said second top portion, wherein said tongue is located in one of said first top portion or said second top portion and wherein said groove is located in the one of said first top portion or said second top portion in which said tongue is not located;
an inner member (306) comprising:
   a third side portion (318) having a fifth end, a sixth end;
   a third top portion (320) that extends away from said fifth end in said second direction; and
   a second jaw clamp element (322) at said sixth end and configured with only one set of projections, wherein said one set of projections are substantially facing only in said second direction; and
a fastener (328) configured to effect movement of said third side portion toward and away from said second side portion,
wherein said third top portion (320) is in contact with and is slidably located between said first top portion (312) and said shelf portion (316) and wherein-said first projections of said first jaw clamp element (314) face said one set of projections of said second jaw clamp element (322).

* * * * *